(12) United States Patent
Brinkman et al.

(10) Patent No.: US 12,309,152 B2
(45) Date of Patent: May 20, 2025

(54) ACCESS CONTROL FOR REQUESTS TO SERVICES

(71) Applicant: CITIBANK, N.A., New York, NY (US)

(72) Inventors: Zachary Brinkman, Duluth, GA (US); Jeremy R. Sutch, Wilmington, DE (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/234,258

(22) Filed: Aug. 15, 2023

(65) Prior Publication Data
US 2025/0063045 A1 Feb. 20, 2025

(51) Int. Cl.
*H04L 9/40* (2022.01)
*G06Q 20/40* (2012.01)

(52) U.S. Cl.
CPC ......... *H04L 63/10* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 5,926,549 A * | 7/1999 | Pinkas | ................... | H04L 63/123 713/168 |
| 6,892,302 B2 * | 5/2005 | Wheeler | ............. | H04L 63/0428 380/282 |
| 6,983,377 B1 * | 1/2006 | Beesley | ................... | G06F 21/31 709/229 |
| 7,231,661 B1 * | 6/2007 | Villavicencio | .......... | H04L 63/08 713/168 |
| 7,249,369 B2 * | 7/2007 | Knouse | ................. | G06F 16/955 707/E17.112 |

(Continued)

FOREIGN PATENT DOCUMENTS

WO WO-2019169405 A1 * 9/2019 ............. G06Q 20/40

OTHER PUBLICATIONS

Ching et al "Authorization in the Digital Library: Secure Access to Services Across Enterprise Boundaries," IEEE, pp. 110-119 (Year: 1996).*

(Continued)

*Primary Examiner* — Luu T Pham
*Assistant Examiner* — James J Wilcox
(74) *Attorney, Agent, or Firm* — Foley & Lardner LLP

(57) ABSTRACT

Presented herein are system and methods for controlling access to services for processing requests. A server maintains rule sets defined for risk levels to control access to second services. Each of the risk levels defines a respective group of rule sets from the rule sets to apply. The server receives a request including authentication information of a transaction type for an end user device to access a second service. The server determines risk parameters and a challenge threshold. The server identifies a risk level for the request based on the risk parameters. The server selects a group of rule sets to apply for the identified risk level and applies the group of rule sets to the authentication information to perform at least one of a denial, allowance, or challenge of the request of the transaction type using the challenge threshold, for the end user device to access the second service.

17 Claims, 6 Drawing Sheets

(56) References Cited

U.S. PATENT DOCUMENTS

| | | | | |
|---|---|---|---|---|
| 7,322,040 | B1* | 1/2008 | Olson | H04L 63/205 726/8 |
| 7,437,752 | B2* | 10/2008 | Heard | H04L 63/101 380/247 |
| 7,552,480 | B1* | 6/2009 | Voss | G06F 21/577 713/150 |
| 7,577,132 | B2* | 8/2009 | Katz | H04L 63/1416 370/401 |
| 7,733,884 | B1* | 6/2010 | Sidebottom | H04L 63/102 705/54 |
| 7,908,645 | B2* | 3/2011 | Varghese | G06F 21/552 715/833 |
| 7,912,971 | B1* | 3/2011 | Dunn | H04L 63/102 726/28 |
| 8,244,629 | B2* | 8/2012 | Lewis | G06Q 20/4016 705/26.1 |
| 8,447,829 | B1* | 5/2013 | Geller | H04L 9/3239 709/217 |
| 8,601,550 | B2* | 12/2013 | Hopen | H04L 63/10 709/224 |
| 8,646,060 | B1* | 2/2014 | Ben Ayed | H04W 4/20 726/9 |
| 8,762,213 | B1* | 6/2014 | Schutz | G06Q 30/04 705/26.1 |
| 8,892,492 | B2* | 11/2014 | Cowham | H04L 63/102 382/128 |
| 9,087,189 | B1* | 7/2015 | Koeten | H04L 41/28 |
| 9,355,231 | B2* | 5/2016 | Disraeli | H04L 63/083 |
| 9,392,022 | B2* | 7/2016 | Frascadore | G06F 21/577 |
| 9,426,182 | B1* | 8/2016 | Zeljko | H04L 63/08 |
| 9,438,618 | B1* | 9/2016 | Sultan | G06F 21/53 |
| 9,456,054 | B2* | 9/2016 | Jacobson | H04L 63/0227 |
| 9,710,984 | B2* | 7/2017 | Benkert | H04W 12/06 |
| 9,734,349 | B1* | 8/2017 | Prafullchandra | G06F 21/6218 |
| 9,807,094 | B1* | 10/2017 | Liu | H04L 63/102 |
| 9,846,878 | B2* | 12/2017 | Kumnick | G06Q 20/4016 |
| 9,923,927 | B1* | 3/2018 | Mcclintock | H04L 63/0846 |
| 10,009,378 | B2* | 6/2018 | Chiviendacz | G06F 21/40 |
| 10,091,231 | B1* | 10/2018 | Gates | H04L 63/1425 |
| 10,104,097 | B1* | 10/2018 | Yumer | H04L 63/20 |
| 10,127,554 | B2* | 11/2018 | Russell | G06Q 20/40 |
| 10,154,007 | B1* | 12/2018 | Viswanathan | H04L 63/20 |
| 10,154,021 | B1* | 12/2018 | Lerner | H04L 9/32 |
| 10,181,032 | B1* | 1/2019 | Sadaghiani | G06N 3/08 |
| 10,362,481 | B2* | 7/2019 | Green | H04W 12/06 |
| 10,373,140 | B1* | 8/2019 | Chang | G06F 16/24575 |
| 10,387,980 | B1* | 8/2019 | Shahidzadeh | G06Q 40/123 |
| 10,475,033 | B2* | 11/2019 | Mankad | G06Q 20/4016 |
| 10,491,603 | B1* | 11/2019 | Robinson | H04L 63/20 |
| 10,565,566 | B1* | 2/2020 | Davis | G06Q 30/0613 |
| 10,572,874 | B1* | 2/2020 | Shahidzadeh | G06Q 20/3821 |
| 10,608,997 | B1* | 3/2020 | Sethi | H04L 63/123 |
| 10,609,077 | B1* | 3/2020 | Mehr | H04L 63/08 |
| 10,685,310 | B1* | 6/2020 | McCuiston | G06Q 10/0637 |
| 10,708,305 | B2* | 7/2020 | Barday | H04L 63/126 |
| 10,755,281 | B1* | 8/2020 | Yip | G06Q 20/4016 |
| 10,824,702 | B1* | 11/2020 | Shahidzadeh | G06F 21/31 |
| 10,911,428 | B1* | 2/2021 | Roth | H04L 9/3213 |
| 10,937,296 | B1* | 3/2021 | Kukreja | H04W 12/63 |
| 10,944,725 | B2* | 3/2021 | Gunasingam | G06F 16/214 |
| 10,951,606 | B1* | 3/2021 | Shahidzadeh | H04W 4/029 |
| 10,972,477 | B1* | 4/2021 | McCorkendale | H04L 63/1433 |
| 10,992,678 | B1* | 4/2021 | Gilman | H04L 63/10 |
| 11,005,839 | B1* | 5/2021 | Shahidzadeh | H04W 12/06 |
| 11,032,280 | B1* | 6/2021 | Chhabra | H04L 63/0884 |
| 11,057,356 | B2* | 7/2021 | Malhotra | G06F 16/288 |
| 11,063,930 | B1* | 7/2021 | Bose | H04L 63/0428 |
| 11,082,487 | B1* | 8/2021 | Jain | H04L 67/1089 |
| 11,087,334 | B1* | 8/2021 | McEachern | H04L 51/046 |
| 11,128,636 | B1* | 9/2021 | Jorasch | G06V 20/10 |
| 11,218,511 | B1* | 1/2022 | Pugalia | H04L 63/102 |
| 11,329,998 | B1* | 5/2022 | Shahidzadeh | H04L 63/14 |
| 11,418,492 | B2* | 8/2022 | Gunasingam | G06F 21/6245 |
| 11,425,140 | B1* | 8/2022 | Bansal | H04L 63/101 |
| 11,455,641 | B1* | 9/2022 | Shahidzadeh | H04L 63/0892 |
| 11,483,353 | B1* | 10/2022 | Shen | H04L 63/20 |
| 11,483,355 | B1* | 10/2022 | Abershitz | H04L 63/0884 |
| 11,575,673 | B2* | 2/2023 | Padmani | H04L 67/51 |
| 11,575,680 | B1* | 2/2023 | Challey | G06N 20/00 |
| 11,593,773 | B1* | 2/2023 | Yip | G06Q 20/4015 |
| 11,605,093 | B1* | 3/2023 | Cervantez | G06Q 30/0185 |
| 11,704,667 | B2* | 7/2023 | Song | G06Q 20/383 705/76 |
| 11,736,525 | B1* | 8/2023 | Rungta | G06F 21/604 726/1 |
| 11,816,672 | B1* | 11/2023 | Singh | G06Q 20/382 |
| 11,836,727 | B1* | 12/2023 | Parekh | G06Q 30/0185 |
| 11,868,852 | B1* | 1/2024 | Watson | H04L 63/10 |
| 11,886,232 | B2* | 1/2024 | Mahaffey | G06F 21/577 |
| 11,895,121 | B1* | 2/2024 | Karim | H04L 63/20 |
| 11,900,341 | B1* | 2/2024 | Chiu | G06Q 20/381 |
| 11,956,253 | B1* | 4/2024 | Lin | G06N 20/00 |
| 11,968,241 | B1* | 4/2024 | Kjelstrup | G06N 20/00 |
| 12,013,953 | B2* | 6/2024 | Kassouf | H04L 63/08 |
| 2002/0062338 | A1* | 5/2002 | Mccurley | H04L 63/101 709/201 |
| 2002/0091745 | A1* | 7/2002 | Ramamurthy | G06F 16/9535 707/E17.112 |
| 2002/0091798 | A1* | 7/2002 | Joshi | H04L 67/02 707/E17.112 |
| 2002/0099671 | A1* | 7/2002 | Mastin Crosbie | G06F 21/62 707/E17.112 |
| 2002/0103917 | A1* | 8/2002 | Kay | H04L 63/08 709/205 |
| 2002/0112185 | A1* | 8/2002 | Hodges | H04L 63/105 709/224 |
| 2002/0120599 | A1* | 8/2002 | Knouse | H04L 63/102 707/E17.112 |
| 2002/0129135 | A1* | 9/2002 | Delany | G06Q 10/06 707/E17.005 |
| 2002/0147929 | A1* | 10/2002 | Rose | G06F 21/6209 726/10 |
| 2002/0156879 | A1* | 10/2002 | Delany | H04L 63/102 709/229 |
| 2002/0165960 | A1* | 11/2002 | Chan | G06F 21/604 709/225 |
| 2002/0166049 | A1* | 11/2002 | Sinn | G06F 21/6218 713/175 |
| 2003/0074580 | A1* | 4/2003 | Knouse | H04L 63/0815 726/4 |
| 2003/0084168 | A1* | 5/2003 | Erickson | H04L 63/102 707/999.009 |
| 2003/0084350 | A1* | 5/2003 | Eibach | H04L 63/08 726/4 |
| 2003/0105862 | A1* | 6/2003 | Villavicencio | H04L 67/306 709/225 |
| 2003/0154401 | A1* | 8/2003 | Hartman | H04L 63/20 726/30 |
| 2003/0177383 | A1* | 9/2003 | Ofek | H04L 47/193 726/14 |
| 2004/0127190 | A1* | 7/2004 | Hansson | H04W 4/50 455/418 |
| 2004/0167984 | A1* | 8/2004 | Herrmann | H04L 63/20 709/229 |
| 2004/0185842 | A1* | 9/2004 | Spaur | B60R 25/33 455/410 |
| 2004/0221174 | A1* | 11/2004 | Le Saint | G06F 21/123 713/172 |
| 2005/0015621 | A1* | 1/2005 | Ashley | H04L 63/0263 726/4 |
| 2005/0071283 | A1* | 3/2005 | Randle | G06Q 20/12 705/75 |
| 2005/0097320 | A1* | 5/2005 | Golan | G06Q 20/4014 713/166 |
| 2006/0075464 | A1* | 4/2006 | Golan | G06F 21/604 726/1 |
| 2006/0079231 | A1* | 4/2006 | Jeong | H04L 63/101 455/434 |
| 2006/0085839 | A1* | 4/2006 | Brandt | H04L 63/102 705/50 |

(56) References Cited

U.S. PATENT DOCUMENTS

| | | | |
|---|---|---|---|
| 2006/0116898 A1* | 6/2006 | Peterson | G06Q 40/03 705/38 |
| 2006/0147043 A1* | 7/2006 | Mann | H04L 63/08 380/270 |
| 2006/0156385 A1* | 7/2006 | Chiviendacz | H04L 9/3271 726/2 |
| 2006/0190984 A1* | 8/2006 | Heard | H04L 9/3226 726/1 |
| 2006/0206931 A1* | 9/2006 | Dillaway | H04L 63/0823 726/9 |
| 2006/0235850 A1* | 10/2006 | Hazelwood | H04L 61/4523 707/999.009 |
| 2006/0236363 A1* | 10/2006 | Heard | H04L 9/3228 726/1 |
| 2006/0242685 A1* | 10/2006 | Heard | H04W 12/35 726/3 |
| 2006/0282660 A1* | 12/2006 | Varghese | G07F 7/1083 713/155 |
| 2007/0061870 A1* | 3/2007 | Ting | H04L 63/102 726/3 |
| 2007/0100768 A1* | 5/2007 | Boccon-Gibod | H04L 9/302 705/59 |
| 2007/0185814 A1* | 8/2007 | Boccon-Gibod | G06Q 20/1235 705/51 |
| 2007/0288487 A1* | 12/2007 | Song | H04L 63/101 |
| 2008/0034092 A1* | 2/2008 | Kikuchi | H04L 63/102 709/225 |
| 2008/0034424 A1* | 2/2008 | Overcash | H04L 63/1416 726/22 |
| 2008/0034425 A1* | 2/2008 | Overcash | G06F 21/55 726/22 |
| 2008/0066165 A1* | 3/2008 | Rosenoer | G06F 21/40 713/182 |
| 2008/0086759 A1* | 4/2008 | Colson | H04L 63/0272 713/182 |
| 2008/0115200 A1* | 5/2008 | Olson | H04L 9/3271 726/10 |
| 2008/0282320 A1* | 11/2008 | DeNovo | G06F 21/604 726/1 |
| 2008/0320549 A1* | 12/2008 | Bertino | G06F 21/604 726/1 |
| 2009/0019514 A1* | 1/2009 | Hazlewood | H04L 63/0281 726/1 |
| 2009/0019533 A1* | 1/2009 | Hazlewood | H04L 63/083 726/5 |
| 2009/0059952 A1* | 3/2009 | Kalofonos | H04L 63/0227 370/465 |
| 2009/0089565 A1* | 4/2009 | Buchanan | H04L 63/107 713/1 |
| 2009/0178105 A1* | 7/2009 | Feng | H04L 63/20 726/1 |
| 2009/0178106 A1* | 7/2009 | Feng | H04L 63/20 726/1 |
| 2009/0313079 A1* | 12/2009 | Wahl | G06F 21/604 705/7.23 |
| 2010/0094791 A1* | 4/2010 | Miltonberger | G06Q 10/067 706/46 |
| 2010/0100967 A1* | 4/2010 | Douglas | H04L 63/102 726/26 |
| 2010/0106764 A1* | 4/2010 | Chadwick | H04L 67/1001 709/202 |
| 2010/0107085 A1* | 4/2010 | Chadwick | H04L 63/20 715/738 |
| 2010/0114776 A1* | 5/2010 | Weller | G06Q 20/4016 705/325 |
| 2010/0250497 A1* | 9/2010 | Redlich | H04L 63/105 707/661 |
| 2010/0299738 A1* | 11/2010 | Wahl | G06F 21/33 713/170 |
| 2010/0332373 A1* | 12/2010 | Crabtree | G06Q 40/04 709/224 |
| 2011/0047610 A1* | 2/2011 | Mylavarapu | H04L 63/0428 726/12 |
| 2011/0072487 A1* | 3/2011 | Hadar | H04L 63/20 709/202 |
| 2011/0083169 A1* | 4/2011 | Moeller | H04L 63/0853 726/5 |
| 2011/0107433 A1* | 5/2011 | Steelberg | G06Q 30/0276 726/27 |
| 2011/0126296 A1* | 5/2011 | Moore | H04L 63/168 726/28 |
| 2011/0196791 A1* | 8/2011 | Dominguez | G06Q 40/00 705/44 |
| 2011/0208601 A1* | 8/2011 | Ferguson | G06Q 40/02 705/16 |
| 2011/0231549 A1* | 9/2011 | Tovar | H04L 63/10 709/225 |
| 2011/0314261 A1* | 12/2011 | Brucker | G06F 21/6218 712/E9.055 |
| 2011/0314529 A1* | 12/2011 | Bailey, Jr. | G09C 1/04 715/764 |
| 2011/0314559 A1* | 12/2011 | Jakobsson | H04L 9/3271 726/28 |
| 2012/0331567 A1* | 12/2012 | Shelton | G06Q 10/00 726/28 |
| 2013/0007891 A1* | 1/2013 | Mogaki | G06F 21/6218 726/27 |
| 2013/0031037 A1* | 1/2013 | Brandt | H04L 63/1408 706/12 |
| 2013/0036455 A1* | 2/2013 | Bodi | H04L 63/0807 726/4 |
| 2013/0046696 A1* | 2/2013 | Radhakrishnan | H04L 63/10 705/65 |
| 2013/0046987 A1* | 2/2013 | Radhakrishnan | H04L 63/10 713/172 |
| 2013/0047201 A1* | 2/2013 | Radhakrishnan | G06F 21/32 726/1 |
| 2013/0047202 A1* | 2/2013 | Radhakrishnan | H04L 63/10 726/1 |
| 2013/0047203 A1* | 2/2013 | Radhakrishnan | G06F 21/577 726/1 |
| 2013/0047204 A1* | 2/2013 | Radhakrishnan | G06F 21/335 726/1 |
| 2013/0047211 A1* | 2/2013 | Radhakrishnan | H04L 9/3213 726/3 |
| 2013/0047240 A1* | 2/2013 | Radhakrishnan | H04L 63/105 726/9 |
| 2013/0047242 A1* | 2/2013 | Radhakrishnan | H04L 9/3231 726/9 |
| 2013/0047243 A1* | 2/2013 | Radhakrishnan | H04L 63/0807 726/9 |
| 2013/0047248 A1* | 2/2013 | Radhakrishnan | G06F 21/335 726/29 |
| 2013/0047262 A1* | 2/2013 | Radhakrishnan | G06Q 20/4016 726/27 |
| 2013/0047263 A1* | 2/2013 | Radhakrishnan | G06F 21/554 726/27 |
| 2013/0144785 A1* | 6/2013 | Karpenko | G06Q 20/425 705/44 |
| 2013/0144888 A1* | 6/2013 | Faith | G06F 16/338 707/755 |
| 2013/0178270 A1* | 7/2013 | Flaherty | G07F 17/3232 463/16 |
| 2013/0218765 A1* | 8/2013 | Hammad | G06Q 20/326 705/41 |
| 2013/0239168 A1* | 9/2013 | Sreenivas | G06F 21/57 726/1 |
| 2013/0239177 A1* | 9/2013 | Sigurdson | H04L 63/102 726/4 |
| 2013/0254831 A1* | 9/2013 | Roach | H04W 12/082 726/1 |
| 2013/0340089 A1* | 12/2013 | Steinberg | G06Q 50/01 726/27 |
| 2013/0347052 A1* | 12/2013 | Choudrie | G06F 21/577 726/1 |
| 2014/0007222 A1* | 1/2014 | Qureshi | H04L 67/10 726/16 |

(56) References Cited

U.S. PATENT DOCUMENTS

| | | | |
|---|---|---|---|
| 2014/0020072 A1* | 1/2014 | Thomas | H04L 67/10 726/7 |
| 2014/0108789 A1* | 4/2014 | Phatak | H04L 63/0823 713/168 |
| 2014/0164759 A1* | 6/2014 | Dabbiere | H04L 63/0435 726/4 |
| 2014/0165132 A1* | 6/2014 | Stuntebeck | H04L 63/10 726/1 |
| 2014/0165153 A1* | 6/2014 | Dabbiere | H04L 9/3242 726/4 |
| 2014/0165213 A1* | 6/2014 | Stuntebeck | G06Q 10/107 726/29 |
| 2014/0280952 A1* | 9/2014 | Shear | H04L 47/70 709/226 |
| 2014/0282586 A1* | 9/2014 | Shear | G06F 40/00 718/104 |
| 2014/0289833 A1* | 9/2014 | Briceno | H04W 12/06 726/5 |
| 2014/0331279 A1* | 11/2014 | Aissi | G06F 21/57 726/1 |
| 2015/0020152 A1* | 1/2015 | Litichever | H04L 63/14 726/1 |
| 2015/0026027 A1* | 1/2015 | Priess | G06Q 10/04 705/35 |
| 2015/0046339 A1* | 2/2015 | Wong | G06Q 20/322 705/44 |
| 2015/0046969 A1* | 2/2015 | Abuelsaad | G06F 21/6218 726/1 |
| 2015/0058931 A1* | 2/2015 | Miu | G06Q 20/02 707/784 |
| 2015/0058950 A1* | 2/2015 | Miu | G06F 21/31 726/7 |
| 2015/0059003 A1* | 2/2015 | Bouse | G06F 16/2379 726/28 |
| 2015/0067762 A1* | 3/2015 | Belenky | H04L 63/20 726/1 |
| 2015/0094968 A1* | 4/2015 | Jia | G05B 15/02 702/60 |
| 2015/0100528 A1* | 4/2015 | Danson | G06N 5/04 706/21 |
| 2015/0106260 A1* | 4/2015 | Andrews | G06Q 20/4016 705/39 |
| 2015/0120560 A1* | 4/2015 | Fisher | G06Q 20/34 705/44 |
| 2015/0127547 A1* | 5/2015 | Powell | G06Q 20/4016 705/67 |
| 2015/0163158 A1* | 6/2015 | Ryland | H04L 47/70 709/225 |
| 2015/0163206 A1* | 6/2015 | McCarthy | G06F 21/6227 726/4 |
| 2015/0172321 A1* | 6/2015 | Kirti | H04L 63/1425 726/1 |
| 2015/0188949 A1* | 7/2015 | Mahaffey | H04L 41/0894 726/1 |
| 2015/0237071 A1* | 8/2015 | Maher | H04W 12/04 726/1 |
| 2015/0264011 A1* | 9/2015 | Liang | H04L 63/02 726/11 |
| 2015/0269383 A1* | 9/2015 | Lang | G06F 21/57 726/1 |
| 2015/0310188 A1* | 10/2015 | Ford | H04L 63/101 726/28 |
| 2015/0319185 A1* | 11/2015 | Kirti | H04L 63/1416 726/23 |
| 2015/0350194 A1* | 12/2015 | Gilpin | H04L 63/0815 726/8 |
| 2015/0356562 A1* | 12/2015 | Siddens | G06Q 20/4016 705/44 |
| 2016/0012235 A1* | 1/2016 | Lee | G06F 21/6218 726/25 |
| 2016/0012242 A1* | 1/2016 | Brucker | G06F 21/604 726/1 |
| 2016/0014155 A1* | 1/2016 | Brucker | H04L 63/20 726/1 |
| 2016/0034305 A1* | 2/2016 | Shear | G06F 16/285 707/722 |
| 2016/0078203 A1* | 3/2016 | Moloian | H04L 63/102 726/17 |
| 2016/0078236 A1* | 3/2016 | Chesla | G06F 21/604 726/1 |
| 2016/0086184 A1* | 3/2016 | Carpenter | G06Q 20/4016 705/44 |
| 2016/0094531 A1* | 3/2016 | Unnikrishnan | H04L 63/08 726/7 |
| 2016/0099963 A1* | 4/2016 | Mahaffey | G06F 21/554 726/25 |
| 2016/0105441 A1* | 4/2016 | Banerjee | H04L 63/102 726/1 |
| 2016/0112397 A1* | 4/2016 | Mankovskii | H04L 63/105 726/6 |
| 2016/0127367 A1* | 5/2016 | Jevans | G06F 21/51 713/152 |
| 2016/0134616 A1* | 5/2016 | Koushik | H04L 63/0428 726/9 |
| 2016/0139573 A1* | 5/2016 | Soni | H04L 63/10 700/275 |
| 2016/0182527 A1* | 6/2016 | Lietz | G06F 21/604 726/6 |
| 2016/0212166 A1* | 7/2016 | Henry | G06F 21/604 |
| 2016/0212167 A1* | 7/2016 | Dotan | G06F 3/04847 |
| 2016/0212168 A1* | 7/2016 | Dotan | H04L 63/20 |
| 2016/0212169 A1* | 7/2016 | Knjazihhin | H04L 63/20 |
| 2016/0212170 A1* | 7/2016 | Martherus | H04L 63/20 |
| 2016/0219038 A1* | 7/2016 | Stephenson | H04W 12/068 |
| 2016/0360430 A1* | 12/2016 | Stevens | H04W 76/30 |
| 2017/0024572 A1* | 1/2017 | Ferraiolo | G06F 16/176 |
| 2017/0041296 A1* | 2/2017 | Ford | G06F 21/64 |
| 2017/0063932 A1* | 3/2017 | Hubbard | G06Q 20/409 |
| 2017/0083914 A1* | 3/2017 | Baker | G06Q 20/4016 |
| 2017/0091772 A1* | 3/2017 | Piel | G06Q 20/36 |
| 2017/0105171 A1* | 4/2017 | Srivastava | H04L 67/63 |
| 2017/0140384 A1* | 5/2017 | Zoldi | G06Q 20/4016 |
| 2017/0148009 A1* | 5/2017 | Perez Lafuente | H04L 63/20 |
| 2017/0163647 A1* | 6/2017 | Cernoch | H04L 63/08 |
| 2017/0230419 A1* | 8/2017 | Prafullchandra | G06F 21/604 |
| 2017/0255932 A1* | 9/2017 | Aabye | G06Q 20/38215 |
| 2017/0262842 A1* | 9/2017 | Subbarayan | G06Q 20/38215 |
| 2017/0302673 A1* | 10/2017 | Makhervaks | H04L 63/101 |
| 2017/0308706 A1* | 10/2017 | Ray | H04L 63/1441 |
| 2017/0352028 A1* | 12/2017 | Vridhachalam | G06Q 20/38215 |
| 2017/0353451 A1* | 12/2017 | Metke | H04W 12/06 |
| 2017/0359306 A1* | 12/2017 | Thomas | G06F 21/52 |
| 2017/0359377 A1* | 12/2017 | Mao | H04L 41/145 |
| 2017/0359725 A1* | 12/2017 | Bolte | H04W 12/068 |
| 2017/0364450 A1* | 12/2017 | Struttmann | H04L 9/3297 |
| 2017/0364576 A1* | 12/2017 | Chesla | H04L 63/105 |
| 2018/0004937 A1* | 1/2018 | Shannon | H04L 9/0891 |
| 2018/0007062 A1* | 1/2018 | Maheshwari | H04L 63/105 |
| 2018/0039990 A1* | 2/2018 | Lindemann | G06V 40/19 |
| 2018/0041503 A1* | 2/2018 | Lindemann | H04L 63/061 |
| 2018/0062847 A1* | 3/2018 | Mildh | H04W 12/033 |
| 2018/0069898 A1* | 3/2018 | Pacifici | H04L 63/20 |
| 2018/0091516 A1* | 3/2018 | Nixon | G06Q 10/06 |
| 2018/0174137 A1* | 6/2018 | Subbarayan | G06Q 50/01 |
| 2018/0174138 A1* | 6/2018 | Subbarayan | G06Q 20/385 |
| 2018/0183737 A1* | 6/2018 | Subbarayan | H04L 51/216 |
| 2018/0218145 A1* | 8/2018 | Hussain | H04L 63/10 |
| 2018/0248895 A1* | 8/2018 | Watson | H04L 63/083 |
| 2018/0278697 A1* | 9/2018 | Cariou | H04L 67/51 |
| 2018/0288063 A1* | 10/2018 | Koottayi | G06F 21/50 |
| 2018/0295518 A1* | 10/2018 | Alloche | H04L 9/3268 |
| 2018/0307859 A1* | 10/2018 | LaFever | H04L 63/20 |
| 2018/0309778 A1* | 10/2018 | Sugarbaker | H04L 43/08 |
| 2018/0315051 A1* | 11/2018 | Hurley | G06Q 20/326 |
| 2018/0337939 A1* | 11/2018 | Agarwal | G06F 16/26 |
| 2018/0343246 A1* | 11/2018 | Benayed | H04L 9/3226 |
| 2018/0359244 A1* | 12/2018 | Cockerill | H04L 63/105 |
| 2018/0364996 A1* | 12/2018 | Anandam | G06F 8/61 |
| 2018/0365435 A1* | 12/2018 | Anandam | H04L 41/0894 |

(56) References Cited

U.S. PATENT DOCUMENTS

| | | | |
|---|---|---|---|
| 2018/0367515 A1* | 12/2018 | Anandam | H04L 63/10 |
| 2018/0375886 A1* | 12/2018 | Kirti | H04W 12/086 |
| 2019/0014085 A1* | 1/2019 | Soliman | H04L 63/0263 |
| 2019/0058712 A1* | 2/2019 | Jones | H04L 63/18 |
| 2019/0068627 A1* | 2/2019 | Thampy | H04L 63/1425 |
| 2019/0081963 A1* | 3/2019 | Waghorn | G06F 21/552 |
| 2019/0095596 A1* | 3/2019 | Manganelli | G06F 21/32 |
| 2019/0098037 A1* | 3/2019 | Shenoy, Jr. | H04L 63/1441 |
| 2019/0124081 A1* | 4/2019 | Nowak | H04L 63/0892 |
| 2019/0124112 A1* | 4/2019 | Thomas | G06F 21/44 |
| 2019/0141037 A1* | 5/2019 | Lerner | H04L 63/104 |
| 2019/0147515 A1* | 5/2019 | Hurley | G06Q 20/3821 705/44 |
| 2019/0164156 A1* | 5/2019 | Lindemann | H04L 9/3271 |
| 2019/0188389 A1* | 6/2019 | Peled | H04L 63/20 |
| 2019/0205511 A1* | 7/2019 | Zhan | H04L 63/1416 |
| 2019/0205885 A1* | 7/2019 | Lim | G06F 16/9566 |
| 2019/0238506 A1* | 8/2019 | Shaw | H04L 63/102 |
| 2019/0238538 A1* | 8/2019 | Shaw | H04L 63/0227 |
| 2019/0238591 A1* | 8/2019 | Shaw | H04L 63/0876 |
| 2019/0250898 A1* | 8/2019 | Yang | H04W 12/08 |
| 2019/0261203 A1* | 8/2019 | Raleigh | H04W 24/08 |
| 2019/0273746 A1* | 9/2019 | Coffing | G06Q 20/40 |
| 2019/0281042 A1* | 9/2019 | Jakobsson | H04L 63/1483 |
| 2019/0297113 A1* | 9/2019 | Yang | H04L 63/1408 |
| 2019/0303600 A1* | 10/2019 | Hamel | H04L 9/3239 |
| 2019/0305954 A1* | 10/2019 | Hamel | H04L 9/0891 |
| 2019/0305964 A1* | 10/2019 | Hamel | H04L 9/0891 |
| 2019/0305965 A1* | 10/2019 | Hamel | H04L 9/3231 |
| 2019/0305967 A1* | 10/2019 | Hamel | G07C 9/00857 |
| 2019/0306171 A1* | 10/2019 | Sisley | H04W 12/08 |
| 2019/0311140 A1* | 10/2019 | Braksator | G06F 16/903 |
| 2019/0313254 A1* | 10/2019 | Zaks | H04W 12/069 |
| 2019/0319940 A1* | 10/2019 | Hamel | G06F 21/64 |
| 2019/0334921 A1* | 10/2019 | Pattar | H04L 9/3271 |
| 2019/0349426 A1* | 11/2019 | Smith | H04W 4/08 |
| 2019/0364046 A1* | 11/2019 | Kurian | H04L 9/0643 |
| 2019/0392450 A1* | 12/2019 | Gosset | H04L 63/101 |
| 2020/0007395 A1* | 1/2020 | Fainberg | H04L 41/0894 |
| 2020/0007396 A1* | 1/2020 | Fainberg | H04L 41/0894 |
| 2020/0007397 A1* | 1/2020 | Fainberg | H04L 41/0226 |
| 2020/0007536 A1* | 1/2020 | Piel | G06Q 20/401 |
| 2020/0007570 A1* | 1/2020 | Lam | H04L 63/1433 |
| 2020/0012810 A1* | 1/2020 | Chavez | G06F 16/9535 |
| 2020/0042463 A1* | 2/2020 | Thomas | H04L 63/102 |
| 2020/0045026 A1* | 2/2020 | Sagalovskiy | H04L 63/102 |
| 2020/0053111 A1* | 2/2020 | Jakobsson | H04L 63/1416 |
| 2020/0076812 A1* | 3/2020 | Spurlock | G06N 20/00 |
| 2020/0076819 A1* | 3/2020 | Spurlock | G06F 21/10 |
| 2020/0104521 A1* | 4/2020 | Malliah | G06F 16/90 |
| 2020/0104851 A1* | 4/2020 | Agarwal | G06N 3/084 |
| 2020/0106780 A1* | 4/2020 | Malliah | G06F 16/437 |
| 2020/0128047 A1* | 4/2020 | Biswas | H04L 63/1425 |
| 2020/0137081 A1* | 4/2020 | Goldstein | H04L 63/083 |
| 2020/0137110 A1* | 4/2020 | Tyler | H04L 63/1483 |
| 2020/0162271 A1* | 5/2020 | Cambou | H04L 63/0435 |
| 2020/0228574 A1* | 7/2020 | Summers | H04L 63/08 |
| 2020/0249927 A1* | 8/2020 | Fradkin | G06F 8/63 |
| 2020/0285761 A1* | 9/2020 | Buck | G06F 21/604 |
| 2020/0287793 A1* | 9/2020 | Buck | G06F 21/577 |
| 2020/0287910 A1* | 9/2020 | Zerrad | H04L 63/102 |
| 2020/0287924 A1* | 9/2020 | Zhang | H04L 63/102 |
| 2020/0296139 A1* | 9/2020 | Fainberg | H04L 63/205 |
| 2020/0304503 A1* | 9/2020 | Zerrad | H04L 63/10 |
| 2020/0322369 A1* | 10/2020 | Raghuramu | H04L 63/102 |
| 2020/0336508 A1* | 10/2020 | Srivastava | H04L 63/20 |
| 2020/0336911 A1* | 10/2020 | Duan | H04L 63/101 |
| 2020/0396259 A1* | 12/2020 | Schory | H04L 63/205 |
| 2020/0403992 A1* | 12/2020 | Huffman | H04L 63/083 |
| 2020/0412767 A1* | 12/2020 | Crabtree | H04L 63/1441 |
| 2021/0021594 A1* | 1/2021 | Guim Bernat | H04L 63/105 |
| 2021/0035107 A1* | 2/2021 | Law | H04L 63/126 |
| 2021/0049597 A1* | 2/2021 | Kumra | G06Q 20/3821 |
| 2021/0058395 A1* | 2/2021 | Jakobsson | H04L 67/306 |
| 2021/0065170 A1* | 3/2021 | Shriver | G06Q 20/02 |
| 2021/0065171 A1* | 3/2021 | Pliasunov | G06Q 20/3829 |
| 2021/0084020 A1* | 3/2021 | Larose | H04L 63/0807 |
| 2021/0126789 A1* | 4/2021 | Chang | H04L 67/306 |
| 2021/0126972 A1* | 4/2021 | Lobner | H04W 12/08 |
| 2021/0133298 A1* | 5/2021 | Andrews | G06F 21/53 |
| 2021/0135943 A1* | 5/2021 | Andrews | H04L 41/0893 |
| 2021/0136115 A1* | 5/2021 | Andrews | H04L 63/1433 |
| 2021/0141932 A1* | 5/2021 | Barday | G06F 16/125 |
| 2021/0152555 A1* | 5/2021 | Djosic | G06N 20/00 |
| 2021/0160235 A1* | 5/2021 | Lerner | H04L 9/0866 |
| 2021/0160237 A1* | 5/2021 | Rozner | H04L 9/3213 |
| 2021/0166322 A1* | 6/2021 | Allen | G06Q 40/08 |
| 2021/0185076 A1* | 6/2021 | Miller | H04L 63/107 |
| 2021/0203507 A1* | 7/2021 | Rule | H04L 9/14 |
| 2021/0224799 A1* | 7/2021 | Ongpin | H04L 63/083 |
| 2021/0224810 A1* | 7/2021 | Benkreira | G06Q 20/4016 |
| 2021/0258329 A1* | 8/2021 | Clayton | H04L 63/0876 |
| 2021/0294901 A1* | 9/2021 | Agarwwal | H04L 41/145 |
| 2021/0303512 A1* | 9/2021 | Barday | H04L 63/20 |
| 2021/0326889 A1* | 10/2021 | Wang | G06Q 20/3825 |
| 2021/0342441 A1* | 11/2021 | Ross | G06F 21/577 |
| 2021/0342849 A1* | 11/2021 | Yang | H04L 67/104 |
| 2021/0352073 A1* | 11/2021 | O'Connell | G06F 21/577 |
| 2021/0392142 A1* | 12/2021 | Stephens | H04L 63/104 |
| 2021/0400048 A1* | 12/2021 | Liem | G07C 9/29 |
| 2021/0400075 A1* | 12/2021 | Stergioudis | H04L 63/1433 |
| 2021/0406255 A1* | 12/2021 | Raghuramu | G06N 20/00 |
| 2021/0406398 A1* | 12/2021 | Brannon | G06F 21/552 |
| 2021/0406720 A1* | 12/2021 | Song | H04L 63/1425 |
| 2022/0004645 A1* | 1/2022 | Agarwwal | H04L 41/145 |
| 2022/0027442 A1* | 1/2022 | Militello | G06F 21/34 |
| 2022/0050921 A1* | 2/2022 | LaFever | H04L 63/0407 |
| 2022/0092087 A1* | 3/2022 | Raghuramu | H04L 63/20 |
| 2022/0103592 A1* | 3/2022 | Semel | H04L 63/20 |
| 2022/0116392 A1* | 4/2022 | Shah | H04L 63/0876 |
| 2022/0121777 A1* | 4/2022 | Brannon | G06F 16/909 |
| 2022/0122087 A1* | 4/2022 | Gosset | G06Q 20/027 |
| 2022/0131894 A1* | 4/2022 | Hassanzadeh | H04L 63/1433 |
| 2022/0141220 A1* | 5/2022 | Lind | H04L 63/1433 |
| 2022/0159010 A1* | 5/2022 | Bandarupalli | G06F 21/62 |
| 2022/0191205 A1* | 6/2022 | Cook | H04L 41/0627 |
| 2022/0191206 A1* | 6/2022 | Cook | H04L 41/0627 |
| 2022/0191247 A1* | 6/2022 | Dhoble | H04L 63/20 |
| 2022/0201009 A1* | 6/2022 | Dhoble | H04L 67/34 |
| 2022/0201045 A1* | 6/2022 | Brannon | H04L 63/20 |
| 2022/0210043 A1* | 6/2022 | Groot | H04L 43/20 |
| 2022/0217154 A1* | 7/2022 | Song | H04L 51/48 |
| 2022/0224535 A1* | 7/2022 | Coffing | H04L 63/102 |
| 2022/0232008 A1* | 7/2022 | Boding | H04L 63/0263 |
| 2022/0237538 A1* | 7/2022 | Barday | H04L 63/102 |
| 2022/0239648 A1* | 7/2022 | Ramachandran | G06F 21/316 |
| 2022/0247786 A1* | 8/2022 | Vavilala | G06N 20/00 |
| 2022/0255969 A1* | 8/2022 | Cage | H04L 9/50 |
| 2022/0266451 A1* | 8/2022 | Cristache | G05D 1/0297 |
| 2022/0269806 A1* | 8/2022 | Ben-Natan | G06F 21/6218 |
| 2022/0294789 A1* | 9/2022 | Tikhomirov | H04L 12/2816 |
| 2022/0311747 A1* | 9/2022 | Khessin | H04L 63/0281 |
| 2022/0311772 A1* | 9/2022 | Xing | H04L 63/101 |
| 2022/0327223 A1* | 10/2022 | Norman | G06F 21/604 |
| 2022/0337611 A1* | 10/2022 | Brazao | H04L 41/0806 |
| 2022/0345457 A1* | 10/2022 | Jeffords | G06F 21/6218 |
| 2022/0345460 A1* | 10/2022 | Alden | G06F 21/62 |
| 2022/0385656 A1* | 12/2022 | Gujarathi | H04L 63/0876 |
| 2023/0006976 A1* | 1/2023 | Jakobsson | H04L 9/50 |
| 2023/0040365 A1* | 2/2023 | Raleigh | H04W 28/0257 |
| 2023/0054446 A1* | 2/2023 | LaFever | H04W 12/75 |
| 2023/0091318 A1* | 3/2023 | Lindemann | H04L 63/0861 726/4 |
| 2023/0102949 A1* | 3/2023 | Boyle | G06T 7/20 345/423 |
| 2023/0121058 A1* | 4/2023 | Kinyon | G06F 21/554 726/7 |
| 2023/0121564 A1* | 4/2023 | Zou | G06N 3/09 706/12 |
| 2023/0153150 A1* | 5/2023 | Kozlowski | H04L 63/20 718/108 |
| 2023/0156020 A1* | 5/2023 | McCarthy | H04L 63/1425 726/22 |

(56) References Cited

U.S. PATENT DOCUMENTS

| | | | | |
|---|---|---|---|---|
| 2023/0156039 | A1* | 5/2023 | Palmer | H04L 63/101 |
| | | | | 726/1 |
| 2023/0169156 | A1* | 6/2023 | Mozano | G06F 21/316 |
| | | | | 726/4 |
| 2023/0188545 | A1* | 6/2023 | Kaciulis | H04L 63/1441 |
| | | | | 726/1 |
| 2023/0188546 | A1* | 6/2023 | Kaisiadorys | H04L 63/102 |
| | | | | 726/22 |
| 2023/0205898 | A1* | 6/2023 | Venable | G06F 21/6227 |
| | | | | 726/26 |
| 2023/0206329 | A1* | 6/2023 | Cella | G06Q 20/36 |
| 2023/0208840 | A1* | 6/2023 | Venable | H04L 63/102 |
| | | | | 726/1 |
| 2023/0208848 | A1* | 6/2023 | Fainberg | H04L 63/20 |
| | | | | 726/3 |
| 2023/0208882 | A1* | 6/2023 | Crabtree | H04L 63/1408 |
| | | | | 726/22 |
| 2023/0224295 | A1* | 7/2023 | Radhakrishnan | H04L 63/104 |
| | | | | 726/7 |
| 2023/0231854 | A1* | 7/2023 | Blake | H04L 63/1425 |
| | | | | 726/4 |
| 2023/0239311 | A1* | 7/2023 | Hutelmyer | H04L 63/1441 |
| | | | | 726/23 |
| 2023/0239312 | A1* | 7/2023 | Hutelmyer | H04L 63/1408 |
| | | | | 726/23 |
| 2023/0259857 | A1* | 8/2023 | Hogg | G06Q 10/0635 |
| | | | | 726/25 |
| 2023/0267470 | A1* | 8/2023 | Singh | H04L 63/0807 |
| 2023/0275917 | A1* | 8/2023 | Karmali | G06F 16/9537 |
| | | | | 709/224 |
| 2023/0308459 | A1* | 9/2023 | Crabtree | H04L 63/1416 |
| 2023/0319081 | A1* | 10/2023 | Fainberg | H04L 63/1425 |
| | | | | 726/22 |
| 2023/0368187 | A1* | 11/2023 | Chisholm | G06Q 20/3223 |
| 2023/0396627 | A1* | 12/2023 | Kirschbaum | G06F 21/35 |
| 2023/0421377 | A1* | 12/2023 | Jakobsson | H04L 9/50 |
| 2023/0421563 | A1* | 12/2023 | Ahmad | H04L 63/102 |
| 2024/0053951 | A1* | 2/2024 | Moro | G06F 3/165 |
| 2024/0098086 | A1* | 3/2024 | Iranitalab | H04L 63/105 |
| 2024/0129321 | A1* | 4/2024 | Howe | H04L 63/20 |
| 2024/0129338 | A1* | 4/2024 | Azad | H04L 63/1425 |
| 2024/0163312 | A1* | 5/2024 | Azad | H04L 63/20 |
| 2024/0171547 | A1* | 5/2024 | Lee | H04L 63/101 |
| 2024/0187411 | A1* | 6/2024 | Hasan | H04L 63/10 |
| 2024/0250948 | A1* | 7/2024 | Tesis | H04L 63/108 |
| 2024/0273536 | A1* | 8/2024 | Li | G06N 20/00 |
| 2024/0291846 | A1* | 8/2024 | Saraf | H04L 63/0876 |
| 2024/0303650 | A1* | 9/2024 | Li | G06F 30/20 |
| 2025/0030681 | A1* | 1/2025 | Dong | H04L 63/0838 |

OTHER PUBLICATIONS

Damiani et al "New Paradigms for Access Control in Open Environments," 2005 IEEE International Symposium on Signal Processing and Information Technology, pp. 540-545 (Year: 2005).*

Gessner et al "Trustworthy Infrastructure Services for a Secure and Privacy-Respecting Internet of Things, 2012 IEEE 11th Internation Conference on Trust, Security and Privacy in Computing and Communications," IEEE Computer Society, pp. 998-1003 (Year: 2012).*

Chen et al "A Dynamic Risk-based Access Control Model for Cloud Computing," 2016 IEEE International Conferences on Big Data and Cloud Computing (BDCloud), Social Computing and Networking (SocialCom), Sustainable Computing and Communication (SustainCom), IEEE Computer Society, pp. 579-584 (Year: 2016).*

Sharma et al "Using Risk in Access Control for Cloud-Assisted eHealth," 2012 IEEE 14th International Conference on High Performance Computing and Communications, IEEE Computer Society, pp. 1047-1052 (Year: 2012).*

Guo et al "Fraud Risk Monitoring System for E-Banking Transactions," IEEE Computer Society, pp. 100-105 (Year: 2018).*

Beena et al "Mitigating Financial Fraud Using Data Science—A Case Study on Credit Card Frauds," IEEE, pp. 38-43 (Year: 2021).*

Jiang et al "Access Control Model for Composite Web Services," IEEE, pp. 684-688, (Year: 2012).*

Chung et al "Access Control Management of the Cloud Service Platform," IEEE, pp. 621-625 (Year: 2014).*

Reddy et al "Utlization of AI for Streamlining and Optimizing Credit Decision Process and Security Access Loan Risks in the Banking Sector," Proceedings of the International Conference on Inventive Research in Computing Applications, IEEE, pp. 1165-1171 (Year: 2022).*

Prisha et al "Identity Risk Analysis in Mobile Commerce: A Novel Approach," IEEE pp. 185-190 (Year: 2018).*

International Search Report and PCT Application No. PCT/US2024/042051 dated Sep. 12, 2024 (3 Pages).

* cited by examiner

ACCESS CONTROL FOR REQUESTS TO SERVICES

TECHNICAL FIELD

This application generally relates to access control. In particular, the present application relates to control of a request for accessing a service.

BACKGROUND

In a computer networked environment, an access service can detect fraudulent or malicious attempts at accessing other services and may restrict access for attempts identified to be fraudulent or malicious. Such a service may rely on a multitude of external tools for analysis of different parameters of the attempts in order to determine the nature of each attempt. Because such tools reside externally from the service, the tools may introduce lag, redundancy, and overall computational latency due to the coordination and communication when processing access requests. Additionally, when one or more of the external tools are out of service or otherwise becomes inaccessible even if temporarily, the whole access service may be rendered inoperable.

SUMMARY

In controlling access requests, a service may perform an assessment of a fraud risk posed by a request and entity attempting to access resources. Other approaches at detecting fraud and controlling access may rely on a multitude of external, third-party tools, with each tool to analyze various portions of information associated with access attempts to make risk assessments. These tools may often be redundant with some tools analyzing same or overlapping pieces of information for the assessment. This redundancy and reliance on these tools may make it difficult to have granular control. For example, under some approaches, blanket policies may be applied to the access, thereby removing nuance from each access request. Furthermore, the detection of fraud and controlling of access may become infeasible when any one of these tools becomes out-of-service or otherwise inaccessible. Due to dependency on outside services as well as using excessive computational power, these approaches may be ineffective at controlling access to resources.

To address these and other technical challenges, a service can be configured with a set of fraud detection rules (e.g., in the form of modules). Each risk level may correspond to a subset or group of the set of fraud detection rules. Each of these rules may define decision trees and other logic to determine whether to allow or deny access or whether to carry out a challenge for additional authentication information. Each risk level can share one or more of the rules with other risk levels. In this way, each risk level can have a unique group of rule sets that may share rules with another risk level to permit reuse of logic for the rules as well as granularity. This sharing of rules and rule sets can reduce the overall number of unique rules to test for fraud, thereby reducing the amount of computational memory and power to assess requests for fraud. Furthermore, the combination of risk levels and rule sets can enable a scalable approach to fraud detection.

When a high-risk transaction (HRT) request is received, the service may aggregate risk insights in connection with the request and perform additional analysis to assess fraud or riskiness. Risk insights can be gathered from multiple sources. The service may gather risk insights from historical data associated with the end user device submitting the request. The service may maintain a profile associated with the end user device that aggregates historical information about the end user device. For example, the service may maintain bioinformatic information about a user associated with the end user device, trends or transactions performed by the end user device, and other accounts or services used by the end user device, among others. The service can also receive a portion of risk insights or information to determine the risk insights from external, third-party services. The external services may provide information to the service for the service to determine the risk insights. As a part of the information comes from the external services, the service may perform the determination of risk, even if one or more of the third-party services is unable to provide information or risk insights.

Using the risk insights, the service may categorize the request into one of a set of risk levels and identify which rule to use based on the risk level. Each risk level may be defined to correspond to a group or a subset of rule sets to provide a highly granular and nuanced approach to fraud detection. With the identification, the service may perform a check of the request against the group of rule sets to determine whether to allow, deny, or challenge the request. The request may include authentication information to check against the rule set. The authentication information can include a username, password, personal identifying number (PIN), bioinformatics (e.g., a fingerprint), or one or more security questions, among others. The service may perform tiered or decision-tree analysis based on the rule sets identified in the group for the risk level. For example, the rule set may first check that the authentication information has been accurately entered. In this example, the group of rule sets may deny the request if the authentication information was not accurately entered. Conversely, the rule set may allow the request if the authentication information was correctly entered, or the rule set may continue to check the request against other rules of the rule set.

In this manner, the service can provide for modularized rules for risk levels to enact granular control. These rules can enable reusability of rules among risk levels to reduce the overall number of rules. A reduction in rules can lead to reduced computer resources as well as increased scalability. The service can also accept new rules to apply across one or more risk levels, and can further accept new risk levels. The ability to accept new rules and risk levels, as well as determine risk parameters from a variety of sources reduces reliance on third-party services for fraud detection. This increase in scalability enables a quick response to changing fraud risks. Furthermore, the flexibility of the system lends itself to multiple applications, including banking, personal management, social media, or general login accounts.

Aspects of the present disclosure are directed to systems, methods, and non-transitory computer readable media for controlling access to services for processing requests. A server may include at least one processor. The server may maintain a multitude of rule sets defined for a multitude of risk levels. The server may use the rule sets to control access to at least one of a set of second services for at least one of a set of transaction types. The multitude of rule sets may include a first rule set for an allowance of access, a second rule set for a denial of access, and a third rule set for a challenge. Each of the multitude of risk levels may define a respective group of rule sets from the multitude of rule sets to apply. The server may receive a request of a transaction type of the set of transaction types for an end user device to access a second service of the set of second services. The request may include authentication information. The server may determine a set of risk parameters and a challenge threshold based on the transaction type of the request, the end user device, and the second service to be accessed. The server may identify, from the multitude of risk levels, a risk level for the request based on the set of risk parameters. The server may select a group of rule sets from the multitude of rule sets to apply for the identified risk level. The server may apply the group of rule sets to the authentication information to perform at least one of the denial, the allowance, or the challenge of the request of the transaction type using the challenge threshold, for the end user device to access the second service.

In some embodiments, the server may receive an instruction identifying at least one rule set for the multitude of rule sets. The at least one rule set may define logic to perform at least one of the allowance, the denial, or the challenge of requests to access the set of second services. The service may configure the multitude of rule sets to include the at least one rule set identified in the instruction, independent of defining the multitude of risk levels.

In some embodiments, the server may receive an instruction identifying at least one risk level, for the multitude of risk levels, defining the respective group of rules to apply to requests of the at least one risk level. The server may configure the multitude of risk levels to include the at least one risk level defined with the respective group of rules from the multitude of rule sets, independent of defining the multitude of rules sets.

In some embodiments, the server may receive an indication of a change in a level of risk tolerance for accessing at least one of the set of second services for requests of the transaction type. The service may re-configure at least one risk level of the multitude of risk levels with the respective group of rules based on the indication of the change in the level of risk tolerance.

In some embodiments, the service may identify, from the set of transaction types, the transaction type corresponding to the request to access the second service. The server may select, from a set of interdiction protocols, an interdiction protocol to execute on the request based on the transaction type. Applying the group of rule may further include applying the group of rules to execute the interdiction protocol, responsive to determining to perform the challenge of the request. In some embodiments, the service may apply a fraud analytics model to the request to generate a metric indicating a likelihood of fraud in accessing the second service for the type of transaction. Identifying the risk level can include identifying the risk level based on the metric indicating the likelihood of fraud.

In some embodiments, the server may identify, from a set of risk profiling services from which to obtain information on the transaction type of the request, the end user device, or the second service to be accessed, at least one risk profiling service as inaccessible via an interface. Determining the set of risk parameters can include determining the set of risk parameters using information from a remainder of the set of risk profiling services, without information from the at least one risk profiling service.

In some embodiments, applying the group of rules may further include applying the group of rules to perform the challenge of the request, responsive to at least one of the set of risk parameters exceeding the challenge threshold. In some embodiments, applying the group of rule sets may further include performing, based on an output of the challenge performed in accordance with a first rule set of the group of rules sets, a second rules set of the group of rule sets to collect additional information associated with the request with which to determine whether to perform the allowance, denial or the challenge at a second time.

In some embodiments, selecting the group of rules may further include selecting the group of rules for the identified risk level at least partially overlapping with another group of rules for another risk level of the multitude of risk levels. Applying the group of rule sets may further include performing, responsive to no authentication protocol identified in an output of the challenge in accordance with a first rule set of the groups of rules, a second rule set of the group of rule sets to determine to initiate authentication.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

DETAILED DESCRIPTION

Figure 1:
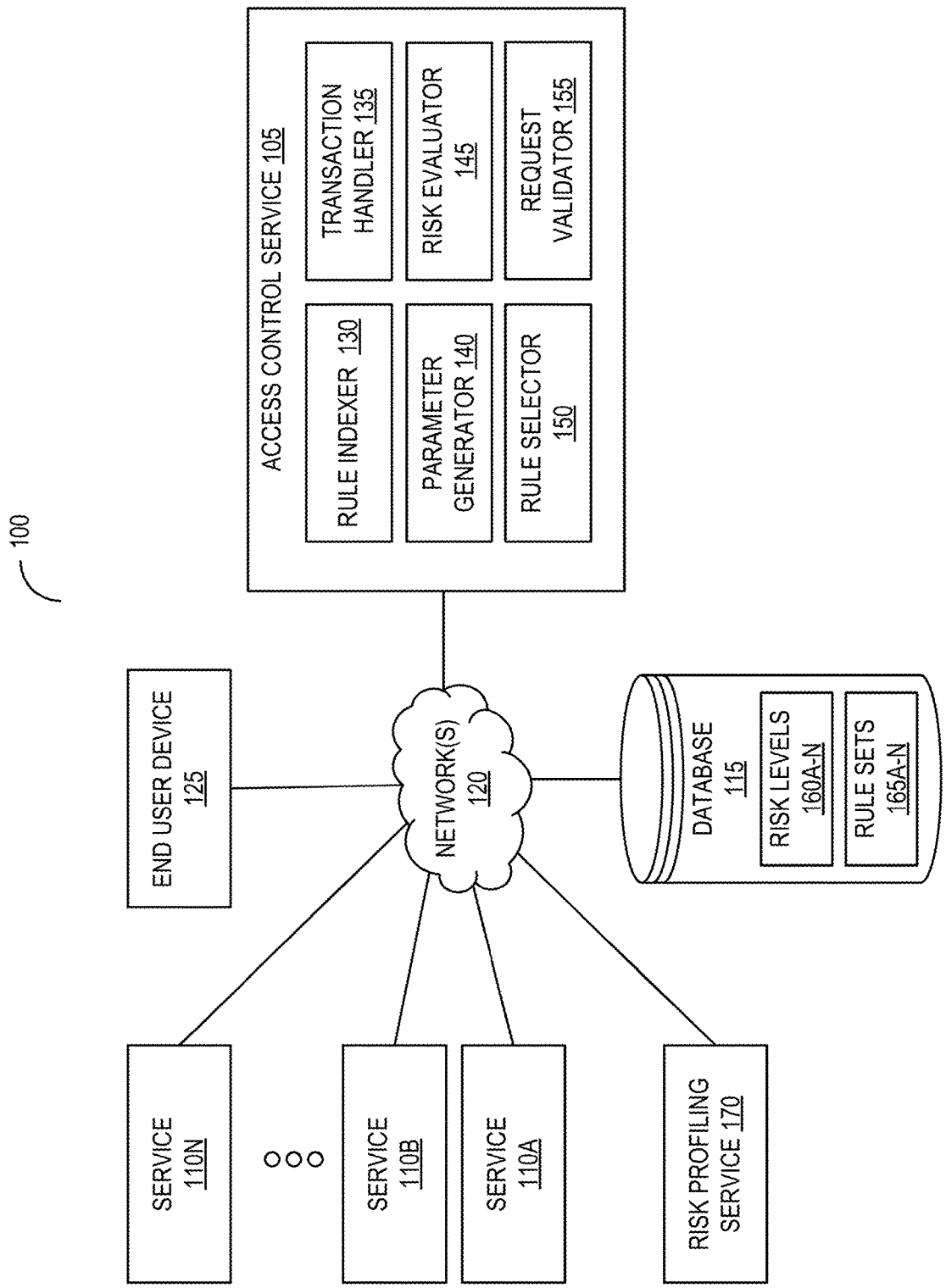
FIG. 1 illustrates a block diagram of an example system for detecting attempts at fraudulent or malicious transactions and controlling access to services in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Disclosed herein are systems and methods for controlling access to services for processing requests. A service can maintain a multitude of rule sets defined for various risks. The rule sets can include instructions for processing requests related to an end user device accessing another service, such as rule sets for allowance of access, denial access, and a challenge of access. The service can receive a request for access to another service from the end user device. Based on the request, the end user device, and the service to be accessed, the service can determine a risk associated with the request. The service can select, using the determined risk, one or more rule sets to apply to the request for access. Depending on the risk and the selected rule sets, the service can act to allow the access request, deny the access request, or further evaluate the access request. Each risk or risk level may define one or more different rule sets to provide a highly granular and nuanced approach to fraud detection. With the identification, the service may perform a check of the request against the rule set to determine whether to allow, deny, or challenge the request.

FIG. 1 depicts a block diagram of an example system 100 for detecting attempts at fraudulent or malicious transactions and controlling access to services. The system 100 may include one or more services 110A-N (hereinafter generally referred to as a service 210 or second service 210), at least one access control service 105, at least one end user device 125, at least one risk profiling service 170, and a database 115, coupled with one another via at least one network 120. The database 115 may include at least risk levels 160 or at least rule sets 165, accessible by any or all components of the system 100. The access control service 105 may include at least one rule indexer 130, at least one transaction handler 135, at least one parameter generator 140, at least one risk evaluator 145, at least one rule selector 150, or at least one request validator 155, among others.

Embodiments may comprise additional or alternative components or omit certain components from those of FIG. 1 and still fall within the scope of this disclosure. For example, the database 115 and the access control service 105 may be part of the same device. Various hardware and software components of one or more public or private networks 120 may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

Each service 110 may be any computing device hosting resources to be accessed by end user device 125. The services 110 may be a set of independent systems which may perform a function for the end user device 125. The services 110 can each perform a function for the end user device 125 independently of the other services 110. The function may be a transaction type. The function or transaction type may be initiated on a scheduled basis, or responsive to a request, such as a request from the end user device 125 to access the services 110. The services 110 may be accessed via an application (e.g., native or web application) on the end user device 125. Access to the services 110 may be contingent upon verification of the authentication information provided by the end user device 125.

The end user device 125 may be any computing device operable by a user or automatic to submit the request to access one or more services 110. The end user device 125 may include any number of computing devices and may be in communication with the services 110, the database 115, or the access control service 105, among others via the network 120. The end user device 125 may submit one or more requests to perform a transaction type with one or more services 110. The end user device 125 may have stored authentication information or be able to accept authentication information, such as by a user interface of the end user device 125. The end user device 125 may be associated with a profile corresponding to a user. The profile or the end user device 125 may store, aggregate, or otherwise include information about the user. Information about the user may include a home, work, or other address of the user, banking information, household information (such as relationship status or children), employment information, demographic information, or frequent locations of the user, among others. Such information may be provided to the risk profiling service 170.

The risk profiling service 170 may be any external or internal system to provide information for determining one or more risk parameters corresponding to a request by the end user device 125 to access the one or more services 110. The risk profiling service 170 may evaluate or provide information regarding different parameters of the system 100, such as the end user device 125, the service 110, a profile associated with the end user device 125 or the service 110, a location associated with the end user device 125 or the service 110, a transaction type of the request, a time of the request, or an amount of the request (e.g., money or shares), among others. The risk profiling service 170 may be one or more risk profiling services 170. Each risk profiling service of the risk profiling services 170 may provide the same, different, or overlapping information to the access control service 105 via the network 120.

The access control service 105 may be any computing device including one or more processors coupled with memory (e.g., the database 115) and software and capable of performing the various processes and tasks described herein. The access control service 105 may be in communication with the services 110, the network 120, the end user device 125, or the database 115. Although shown as a single access control service 105, the access control service 105 may include any number of computing devices. The access control service 105 may receive or retrieve the request from the end user device 125. The access control service 105 may maintain or configure the rule sets 165 or the risk levels 160 to control access requested by the end user device 125 to one or more services 110.

The access control service 105 includes several subsystems to perform the operations described herein. Within access control service 105, the rule indexer 130 manages the rule sets 165 and the risk levels 160. The transaction handler 135 receives requests from the end user device 125 for a transaction type to access one or more services 110. The parameter generator 140 determines a set of risk parameters and a challenge threshold based on the transaction type of the request, the end user device 125, and the service 110. The risk evaluator 145 identifies a risk level of the risk levels 160 for the request based on the set of risk parameters. The rule selector 150 selects a group of rule sets from the rule sets 165 for the identified risk level. The request validator 155 applies the group of rule sets to perform at least one of a denial, allowance, or challenge of the request.

Figure 2:
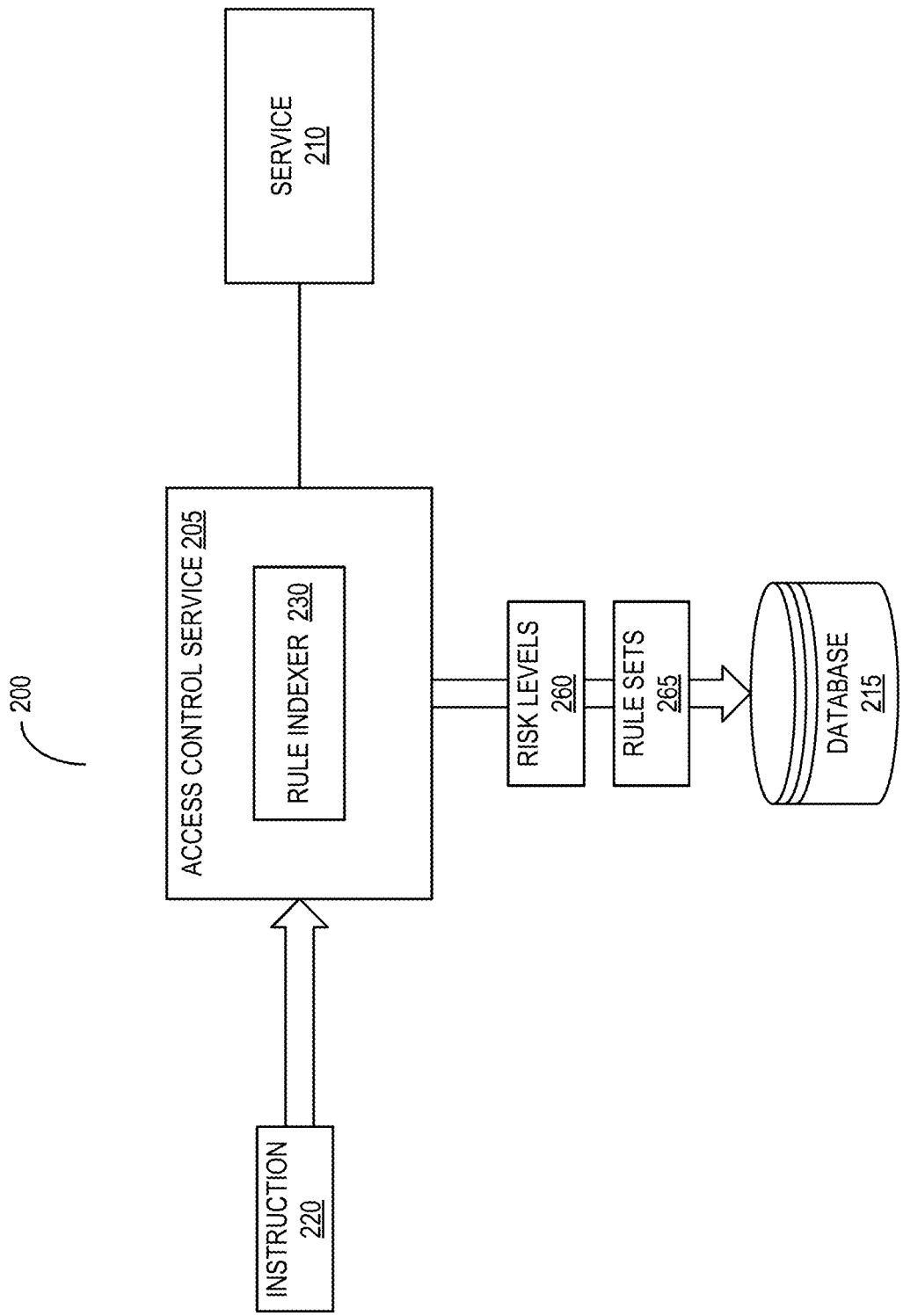
FIG. 2 illustrates a block diagram of an example system for maintaining and configuring rule sets in accordance with an embodiment.

FIG. 2 depicts a block diagram of a system 200 for maintaining and configuring rule sets. The system 200 may include an access control service 205, a service 210, or a database 215. The access control service 205 may include a rule indexer 230, among others. The rule indexer 230 may maintain, access, or manage at least a set of risk levels 260 or rule sets 265. Embodiments may comprise additional or alternative components or omit certain components from those of FIG. 2 and still fall within the scope of this disclosure. Various hardware and software components of one or more public or private networks may interconnect the various components of the system 200. Each component in system 200 (such as the service 210, or the access control service 205) may be any computing device comprising one or more processors coupled with memory and software, and capable of performing the various processes and tasks described herein.

The rule indexer 230 stores and otherwise maintains the rule sets 265 on the database 215. The rule sets 265 may be maintained using one or more data structures, such as an array, a linked list, a tree, a graph, or a hash table, among others. The rule sets 265 may also be stored on the database 215 in the form of one or more script files, such as extensible markup language (XML), Java Script Object (JSON), or initialization (INI) files, among others. The rule indexer 230 may update, change, or store the rule sets 265 in the database 215. The rule indexer 230 may manage or maintain the rule sets 265 in response to a change in the rule sets 265 or in response to a request, among others. For example, a system administrator may provide a definition for the rule sets 265, and the rule indexer 230 may store the definition for the rule sets 265 on the database 215. The database 215 may be any combination of hardware and software to store information, such as the rule sets 265. The rule indexer 230 may read or write other information on the database 215, such as information relating to a profile of an end user device or the risk levels 260. The rule sets 265 may define, identify, or otherwise include one or more rules for controlling access to the service 210. Each rule set 265 may include one or more rules (e.g., logic) to carry out various checks to control access to one or more services 210. The logic may include a decision tree or a finite state transducer defined in a script for the rule set 265. The rule set 265 may be hierarchical and may include rules from other rule sets 265. For example, a first rule set 265 may include some or all of the rules of a second rule set 265. A first rule set 265 may include some or all of the rules of a second rule set 265 and may include additional rules not present in the second rule set 265. In this manner, the rule sets 265 including their rules can be reusable and configurable. That is to say, a rule set 265 can build upon another rule set 265 by including the rules of the latter rule set 265 with additional rules. This enables the system to maintain a framework of configurable, modular rule sets to reduce the quantity of unique rules as well as create a scalable fraud detection system.

The rule sets 265 can define or include rules to allow, deny, or challenge a request for access to the service 210 by an end user device to perform a type of transaction. A transaction type can include actions related to banking (e.g., money transfers, deposits, account management), asset management (e.g., purchasing or selling shares, investing dividends), health management (e.g., requesting a prescription refill, contacting a doctor), scheduling (e.g., changing an appointment, updating a calendar, email access), general account logins (e.g., social media logins, subscription service logins) or credit card management (e.g., requesting a limit increase, accessing a credit card account), among others. The rule sets 265 may be configured to allow, deny, or challenge access to any or all transaction types from a request by an end user device. Allowing a request may refer to enabling the end user device to access the service 210 to perform the transaction. Denying the request may refer to not enabling or allowing the end user device to access the service 210 to perform the transaction. Challenging the request may refer to applying a further rule set 265 or further evaluation to determine to allow the end user device to access or not to access the service 210.

An allowance rule set 265 may include one or more rules by which the access control service 205 may use to determine to allow the end user device to access the service 210. For example, if a request by the end user device satisfies each rule of the rule set 265 for allowance, the end user device may be granted access to the service 210. Conversely, a denial rule set 265 may include one or more rules by which the access control service 205 may use to determine to not allow the end user device to access the service 210. For example, if a request by the end user device satisfies each rule of the rule set 265 for allowance, the end user device may not be granted access to the service 210. The challenge rule set 265 may include one or more rules by which the access control service 205 may use to determine to challenge the end user device to access the service 210. A challenge may be a further evaluation of the request, a re-evaluation of the request, or another condition which is not an allowance or a denial of the request. In some embodiments, the challenge may elicit or request further information from the end user device. In some embodiments, the challenge rule set 265 may be subject to a threshold or challenge threshold, described herein. The challenge rule set 265 may be responsive to not satisfying one or more other rule sets 265, or in response to the challenge threshold being exceeded, among others. The challenge rule set 265 may further evaluate the request in order to establish authenticity to prevent fraudulent access to the service 210.

The rule set 265 can include any combination of rules for denial of access, allowance of access, or challenge of access. For example, a request from the end user device may not satisfy the denial rule set 265 and may then pass to an allowance rule set 265. In this example, if the request further does not satisfy the allowance rule set 265, the request may then be evaluated by a challenge rule set 265. Once configured, the access control service 205 may evaluate the request using the rule sets 265 sequentially, in parallel, or a combination thereof. For example, the access control service 205 may evaluate the request for the allowance rule set 265 and the denial rule set 265 at the same time or in parallel, and may then evaluate the request for the challenge rule set 265. The order of evaluation by the access control service 205 for each rule set 265 is meant to be illustrative and can be in any order, sequence, or parallelism not expressed herein.

In maintaining, the rule indexer 230 may configure, add, or delete one or more rule sets 265. The rule indexer 230 may receive an instruction 220 that identifies at least one rule set 265. The rule indexer 230 may receive the instruction 220 from the service 210, an outside service or administrator of the access control service 205, or from an external service. The instruction 220 may include an additional rule set 265, a change to one or more rule sets 265, or a deletion of one or more rule sets 265, among others. When instructed to change an existing rule set 265, the instruction 220 may define an update to the rule set 265. When instructed to add a new rule set 265, the instruction 220 may define the logic for the new rule set 265 to perform at least one of an allowance, denial, or challenge of a request to access the service 210. When instructed to delete an existing rule set 265, the instruction 220 may identify which rule set 265 is to be deleted. The rule indexer 230 can update the database 215 in accordance with the instruction 220.

The rule indexer 230 may configure, set, or otherwise define the risk levels 260 in conjunction with the rule sets 265. The risk levels 260 may identify define a group of rule sets 265 to apply to the request for the access control service 205 to determine access to the service 210. The risk levels 260 may correspond to a degree of riskiness (e.g., a high probability of a fraudulent or suspicious transaction) of a request from an end user device to access the service 210 to perform a transaction is. The risk level 260 may be expressed numerically or qualitatively. For example, a risk level 260 may be classified as a low risk, a medium risk, a high risk, or a very high risk. A first risk level 260 may also be a risk level of 1, a second risk level 260 may be a risk level of 2, or a sixtieth risk level 260 may be a risk level of 60. Each risk level 260 may correspond to a different group of rule sets 265. A first risk level 260 may share or overlap one or more rule sets 265 with a second risk level 260. For example, a risk level of 5 may include some of the rule sets 265 associated with a risk level of 4 and all of the rule sets 265 assigned to a risk level of 10. The rule sets 265 may build upon each other for each consecutive risk level 260. For example, a risk level 260 of 5 may include all of the rule sets 265 of a risk level of 4 and may include further additional rule sets 265. In this manner, different rule sets 265 can be shared across the risk levels 260, thereby reducing redundancy and streamlining the access framework.

The rule indexer 230 may configure, add, or delete one or more risk levels 260. The rule indexer 230 may receive an instruction 220 that identifies at least one risk level 260. The rule indexer 230 may receive the instruction 220 from the service 210, an outside service or administrator of the access control service 205, or from a third-party service. The instruction 220 may include an additional risk level 260, a change to one or more risk levels 260, or a deletion of one or more risk levels 260, among others. The instruction 220 may also define a risk level 260 to associate with one or more of the rule sets 265. For instance, the instruction 220 may identify subset or a group of rule sets 265 to associate or assign to the risk level 260. The rule indexer 230 can update the definition of the risk levels 260 on the database 215 in accordance with the instruction 220. For example, the rule indexer 230 can write a new risk level 260 into the database 215, delete a risk level 260 from the database 215, or modify one or more rules of one or more rule sets 265 or their association with a risk level 260 in the database 215, responsive to receiving the instruction 220. Therefore, the risk level 260 can be continuously updated or maintained, independently or in relation to the rule sets 265, and vice-versa.

The rule indexer 230 may modify, alter, or otherwise change the risk levels 260 responsive to a change in a level of risk tolerance. Each service of the services 210 or the access control service 205 may determine or identify a corresponding level of risk tolerance for a security breach or occurrence fraud from accessing the service 210 for requests of a type of transaction. The risk tolerance may relate to the transaction type, the end user device, the request, the service 210, among others. The risk tolerance may be used to classify requests into to one or more risk levels 260 to access the service 210. For example, the risk tolerance may define that requests corresponding credit card transactions are to be classified to a risk level above 60 out of 100. In some embodiments, the risk tolerance may be used to re-configure, re-assign, or change associations between risk levels 260 and a group of rule sets 265.

The rule indexer 230 may identify or receive an indication of a change in the level of risk tolerance. In some embodiments, the rule indexer 230 may receive the change through the instruction 220. The instruction 220 may indicate the change in the level of risk tolerance from, for example, the service 210. The instruction 220 may indicate the rule set 265 or the risk level 260 to change based on the change in the level of risk tolerance. In accordance with the instruction 220, the rule indexer 230 may modify, change, or otherwise re-configure the risk levels 260 based on the change in risk tolerance. For example, responsive to receiving the instruction 220 indicating a change to the risk tolerance, the rule indexer 230 may alter the group of rule sets 265 associated with one or more risk levels 260. In some embodiments, the rule indexer 230 may modify, change, or otherwise re-configure the groups of rule sets 265 for a given risk level 260 based on the change in risk tolerance.

Figure 3:
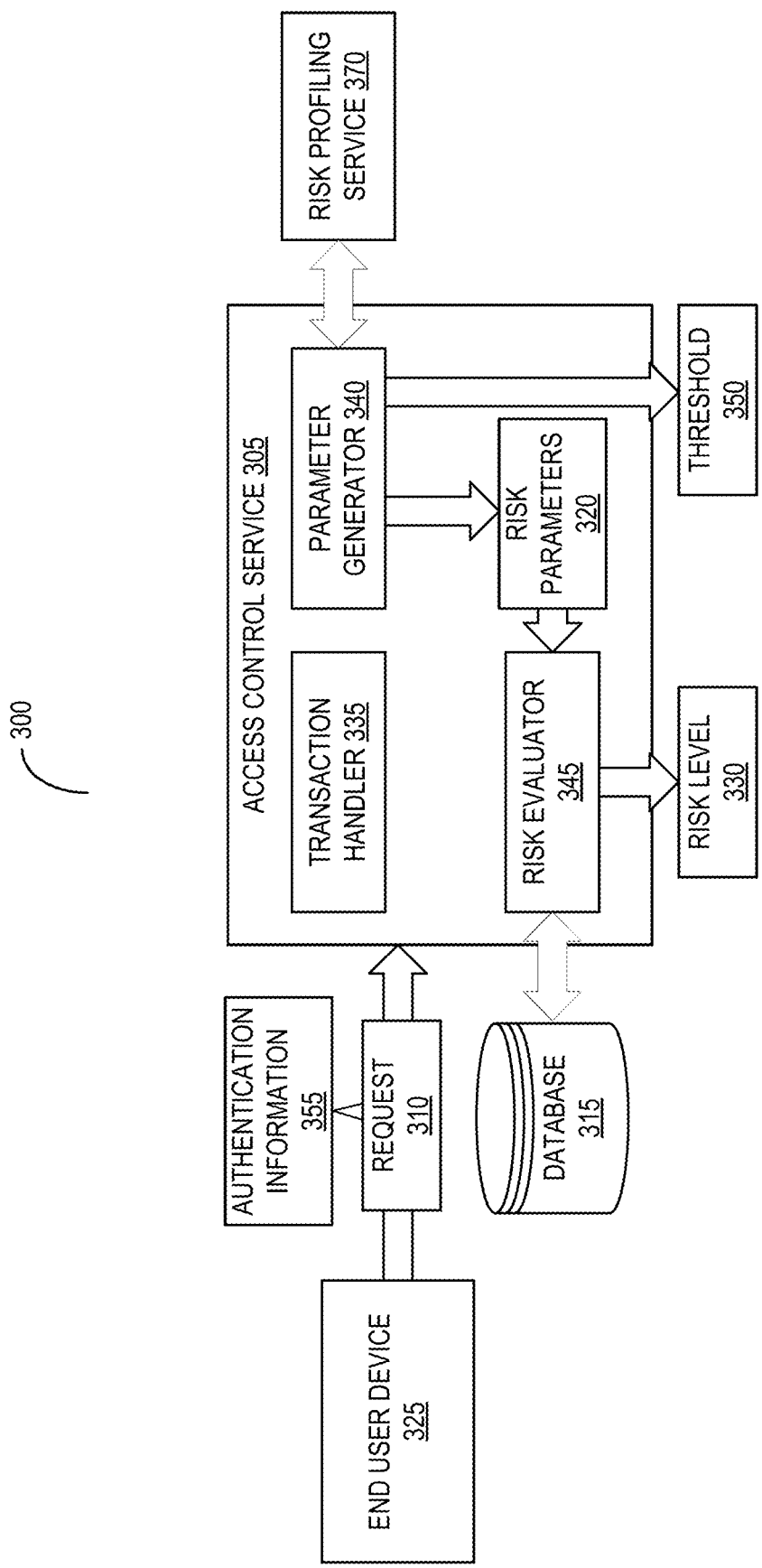
FIG. 3 illustrates a block diagram of an example system for receiving a request of a transaction type and determining risk parameters and a challenge threshold and identifying a risk level in accordance with an embodiment.

FIG. 3 depicts a block diagram of a system 300 for receiving a request of a transaction type, determining risk parameters and a challenge threshold, and identifying a risk level. The system 300 may include an end user device 325, a request 310 including authentication information 355, a risk profiling service 370, a database 315 or an access control service 305, among others. The access control service 305 may include at least a transaction handler 335, a parameter generator 340, or a risk evaluator 345. The access control service 305 may identify or determine at least risk parameters 320, a risk level 330, or a threshold 350. Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the end user device 325, the access control service 305, or the risk profiling service 370) may be any computing device comprising one or more processors coupled with memory and software and capable of performing the various processes and tasks described herein.

In conjunction with the maintenance of the rule sets and the risk levels, access control service 305 may obtain, acquire, or otherwise receive the request 310 from the end user device 325 to access a service. The transaction handler 335 may receive the request 310 from the end user device 325. The transaction handler 335 may receive the request 310 from a user interacting with the end user device 325 to access the service. In some embodiments, the service may forward, send, or otherwise transmit the request from the end user device 325 to the access control service 305. For example, the end user device 325 may send the request 310 to access the service and the service may acknowledge the request and may forward the request to the transaction handler 335. In some embodiments, the end user device 325 may send, provide, or otherwise transmit the request 310 directly to the transaction handler 335.

The request 310 may be to access a service to process a type of transaction identified therein. The request 310 may indicate the service to be accessed. For example, the request 310 can be a request to access a bank account associated with the end user device 325, a credit card account associated with the end user device 325, a social media account associated with the end user device 325, an investment account associated with the end user device 325, or to log into an online game, among others. The transaction to be processed by the corresponding service can be for payment of a credit card, transfer of money, association of a social media account with the end user device 325, purchase of mutual funds, or logging into an online game, among others. In another example, the request for accessing a service to process a transaction can include the end user device 325 attempting to transfer money from one bank account to another, or the request for accessing a service to process a transaction can include the end user device 325 requesting to associate one social media profile of a user with a second social media profile of the user.

The request 310 may identify or include authentication information 355. The authentication information 355 can be any information, an account identifier (e.g., a user name) and credentials (e.g., password, personally identifying number (PIN, or dual-factor authorization), among others, to validate or verify the request 310. The authentication information 355 may identify the end user device 325 or a user associated with the end user device 325. For example, the authentication information 355 may identify a user account of a user operating the end user device 325 and include a location of the end user device 325. The authentication information 355 may be changed by the end user device 325 or the access control service 305. For example, the end user device 325 may update a password of the authentication information 355. Upon receipt, the transaction handler 335 may receive and maintain the request 310 in the database 315. The transaction handler 335 may parse the request 310 to extract or identify the transaction type and the authentication information 355.

With the receipt of the request 310, the parameter generator 340 may identify, generate, or otherwise determine risk parameters 320 based on at least the request 310, the end user device 325, a user associated with the end user device 325, or the service to be accessed, among others. The risk parameters 320 may be any set of evaluations for determining the authenticity of the request 310. The risk parameters 320 may be indicative of a degree of risk of the transaction. For example, the risk parameters 320 may include a set of criteria related to the transaction or the end user device 325. The risk parameters may include a numeric or qualitative score for one or more criteria. For example, the risk parameters 320 may include or identify a score for a location of the end user device 325, a score for the authentication information 355, a score for the time of the request 310, a score for the type or amount of the request 310, among others. The scores may be used to determine the degree of risk of the transaction indicated in the request 310.

The parameter generator 340 may identify any number of risk parameters 320 in relation to the request 310. For example, the parameter generator 340 may identify, from the request 310, a degree of validity of a username and password of the authentication information 355. The parameter generator 340 may determine whether the location associated with the end user device 325 is outside of a geofence associated with the end user device 325. The parameter generator 340 may determine that the end user device 325 or a profile associated with the end user device 325 is new, or has been established for less than a threshold period of time. The parameter generator 340 may determine that the service to be accessed by the end user device 325 is a service that the end user device 325 regularly accesses. The parameter generator 340 may determine that the time of the request 310 is at a time outside of or within a typical time for the end user device 325. The parameter generator 340 may generate a qualitative or quantitative score for each of these events associated with the request 310, or may generate a score for the overall events associated with the request 310, or may not generate any score. The parameter generator 340 may aggregate the events or information associated with the request 310, and this aggregation may be the risk parameters 320. Any one or more of these determinations may be used as the risk parameters 320.

The parameter generator 340 may generate the risk parameters 320 associated with the request using the events or information associated with the request 310, the service, or the end user device 325 through machine learning, statistical modeling, a simple ranking system, or a voting system, among others. For example, the parameter generator 340 may assign a weight to each risk parameter 320 based on the events or information associated with the request. The parameter generator 340 may use historical data associated with the end user device 325 to determine the risk parameters 320.

The parameter generator 340 may determine the risk parameters 320 in conjunction with a risk profiling service 370. The risk profiling service 370 can be a third-party or external service from which the parameter generator 340 may obtain information to determine the risk parameters 320 associated with the request 310. The risk profiling service 370 may collect, gather, or otherwise aggregate at least a portion of the information and events associated with the request 310. For example, the information may identify or include the location of the end user device 325, the authentication information 355, or the service to be accessed by the request 310, among others. In some embodiments, the risk profiling service 370 may determine at least a portion of the risk parameters 320 to provide the access control service 305. The risk profiling service 370 may use one or more machine learning models, statistical analyses, or formulae to apply to the aggregated information to determine the risk parameters 320. In some embodiments, the parameter generator 340 may determine the risk parameters 320 based on the information obtained from each of the risk profiling services 370. In some embodiments, the parameter generator 340 may average the risk parameters 320 derived from each risk profiling service 370, In some embodiments, the parameter generator 340 may use the risk profiling service 370 to validate the risk parameters 320 determined by the parameter generator 340 independently of the risk profiling service 370.

In some embodiments, the parameter generator 340 may monitor whether the risk profiling service 370 is accessible or inaccessible. The risk profiling service 370 may be inaccessible if, for example, the risk profiling service 370 is malfunctioning, disabled, or otherwise offline, if a network or connection between the risk profiling service 370 and the access control service 305 is malfunctioning or offline, or if the risk profiling service 370 is unable to generate risk parameters 320 based on the information or events provided by the parameter generator 340. One or more of the risk profiling services 370 may be inaccessible while one or more of other risk profiling services 370 may be accessible.

The parameter generator 340 may determine that the risk profiling service 370 is inaccessible by receiving an indication from the risk profiling service 370 that is will be inaccessible, prior to becoming inaccessible. For example, one or more of the risk profiling services 370 may send an indication that it will be offline for software updates for a period of time, prior to the one or more risk profiling services 370 going offline. The parameter generator 340 may determine that the risk profiling service 370 is inaccessible by not receiving data (such as the risk parameters 320) for period of time. For example, the parameter generator 340 may transmit information related to the request to the risk profiling service 370 and may not receive a response from the risk profiling service 370 in excess of a threshold period of time. The parameter generator 340 and the risk profiling service 370 may transmit a heartbeat periodically to determine whether the risk profiling service 370 is accessible or inaccessible. For example, the parameter generator 340 may transmit one or more data packets to ping or check in with the risk profiling service 370. In response, the risk profiling service 370 may acknowledge or ping back the parameter generator 340. When determined to be accessible, the parameter generator 340 may retrieve, receive, or otherwise obtain the information from the risk profiling service 370 in determining the risk parameters 320. Otherwise, when determined to be inaccessible, the parameter generator 340 may continue determining the risk parameters 320 without obtaining the information from risk profiling service 370.

The parameter generator 340 may determine the risk parameters 320 without a third-party service. The parameter generator 340 may determine the risk parameters 320 without the risk profiling services 370 if one or more of the risk profiling services 370 are inaccessible. The parameter generator 340 may determine the risk parameters 320 using only a subset of the risk profiling services 370. The parameter generator 340 may determine the risk parameters 320 without the risk profiling service 370 due to being configured to determine the risk parameters 320 without a third-party service such as the risk profiling service 370. In some cases, the parameter generator 340 may not supply all or any information to the risk profiling service 370. In these cases, the parameter generator 340 may determine the risk parameters 320 using partial or incomplete information from the risk profiling service 370. The parameter generator 340 may determine the risk parameters 320 from the incomplete information from the risk profiling service 370 and the withheld information from the risk profiling service 370. By not relying on the risk profiling services 370, the access control service 305 can reduce reliance on outside services, improve security of the access control service 305 by relying less on external services, and can reduce computational power spent transmitting data to the risk profiling services 370.

The parameter generator 340 may establish, train, or otherwise maintain a fraud analytics model for indication of a likelihood of fraud. Fraud may be any attempt at a transaction which impersonates, defunds, or otherwise harms a user of the end user device 325 or which purports an illegal or misuse of the request 310 to access a service for processing a transaction. For example, fraud can include an outside entity attempting to access the service to transfer money from the user associated with the end user device 325 to the outside entity. Fraud can include the outside entity misrepresenting itself as the user of the end user device 325. Fraud can be, for example, the outside entity attempting to access a social media platform of the user to masquerade as the user on the social media platform. The fraud analytics model may include one or more machine learning models, statistical analysis models, or other formulae to determine a likelihood of fraud.

Continuing on, the fraud analytics model may analyze data related to the request 310, the end user device 325, or the service to determine a probability that the request 310 is fraudulent. The fraud analytics model may compare historical data associated with the end user device 325 to the information and events of the request 310 to determine a likelihood or probability of fraud. For example, the fraud analytics model may model the time of day and frequency with which the end user device 325 has historically accessed the service. The fraud analytics model may determine, based on the time and frequency of the request 310, that the request indicates a high or low likelihood of being fraudulent. For example, receiving the request 310 outside of a threshold deviation established by the fraud analytics model may indicate that the request is fraudulent. The fraud analytics model may, in this example, provide a high indication of fraud to the parameter generator 340. In turn, the parameter generator 340 may use the indication of fraud from the fraud analytics model to determine the risk parameters 320.

The parameter generator 340 may calculate, generate, or otherwise determine a threshold 350 (sometimes herein referred to as a challenge threshold 350). The challenge threshold 350 may be a threshold by which the access control service 305 determines to challenge the request 310. The parameter generator 340 may determine the challenge threshold based on at least the request 310, the end user device 325, the transaction type, the service, or a combination thereof. In some embodiments, the parameter generator 340 may determine the threshold 350 based on the risk parameters 320. The parameter generator 340 may associate the type of threshold with the threshold 350. For example, the parameter generator 340 may determine that a transfer of a smaller sum of money has a lower challenge threshold 350 than a transfer of a larger sum of money. For example, the parameter generator 340 may determine the challenge threshold 350 based on the location of the end user device 325 and the type of the transaction indicated in the request 310. In another example, the parameter generator 340 may determine that a request indicating that the end user device 325 is within a geofence established for the end user device 325 by the access control service 305 and indicating that the transaction is to pay an existing balance on a credit card may have a lower challenge threshold 350 than a request indicating that the end user device 325 is outside of the geofence established for the end user device 325 or a request indicating that the transaction is to open a new line of credit.

In some embodiments, the parameter generator 340 may establish different challenge thresholds 350 for different end user devices 325. The parameter generator 340 may establish the different challenge threshold 350 based on a demographic, location, or historical data associated with the end user device 325. A first end user device 325 may have a different challenge threshold 350 than a second end user device 325 for the same requested transaction type. For example, a first end user device 325 with a history of large money transfers may have a lower challenge threshold 350 associated with that type of transaction than a second end user device 325 has.

With the determination of the risk parameters 320, the risk evaluator 345 may select, determine, or otherwise identify a risk level 330 from the set of risk levels 330 for the request 310. The risk level 330 for the request 310 may correspond to at least one of the set of risk levels 330 defined by the access control service 305. The risk evaluator 345 may use a function of the risk parameters 320 to identify a risk level 330 by selecting from a multitude of risk levels. The function may specify or define a combination of risk parameters 320 with at least one of risk levels 330. In some embodiments, the risk evaluator 345 selects the risk level 330 by evaluating that a majority of the risk parameters 320 are associated with the risk level 330. In some embodiments, the risk evaluator 345 selects the risk level 330 as the highest risk level 330 associated with one or more of the risk parameters 320.

In some embodiments, the risk evaluator 345 may identify the risk level 330 in conjunction with the indication of a likelihood of fraud determined by the parameter generator 340. For example, the risk evaluator 345 may determine a greater risk level 330 for a greater likelihood of fraud than a lesser likelihood of fraud. In some embodiments, the risk evaluator 345 may identify the risk level 330 using the risk parameters 320 in conjunction with the indication of a likelihood of fraud. In some embodiments, the risk evaluator 345 may rely on only the indication of a likelihood of fraud to identify the risk level 330.

In some embodiments, the risk evaluator 345 may determine or identify the risk level 330 based information relating to the transaction type of the request 310. The risk level 330 may include tiered risk levels. The risk evaluator 345 may identify the request 310 as belonging to a first risk level of a tiered risk level based on the transaction type of the request 310. For example, if the transaction type of the request 310 relates to a certain type of credit cards, the risk evaluator 345 may determine that the request 310 is associated with a first risk level. Based on the risk evaluator 345 identifying the first risk level for the request 310 using the transaction type, the request 310 may be flagged, noted, or otherwise indicated as high risk. This tiered approach to the risk level 330 may be considered an interdiction protocol. Using the interdiction protocol, the access control service 305 can more quickly filter or flag requests 310 which correspond to a specific transaction type.

Figure 4:
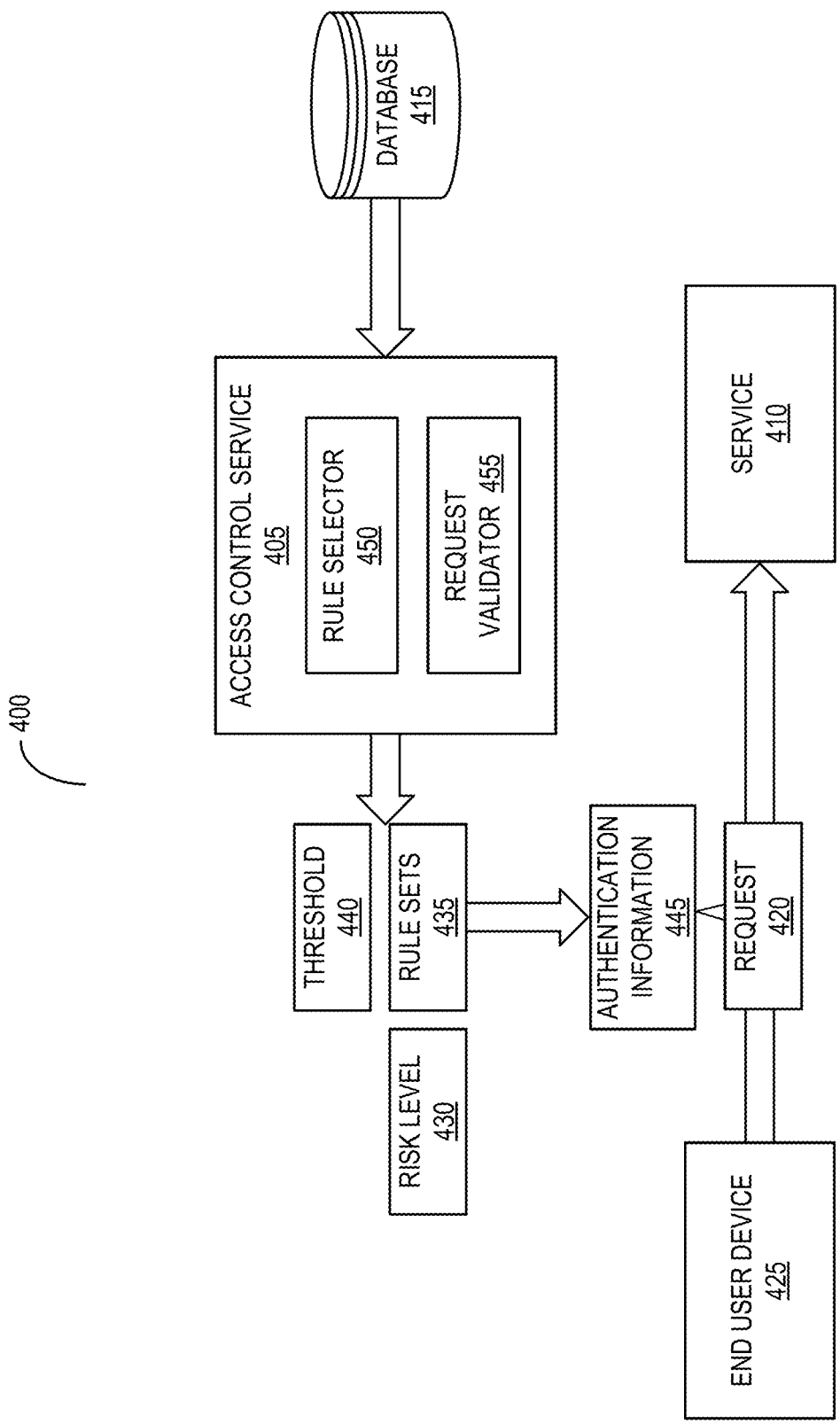
FIG. 4 illustrates a block diagram of an example system for selecting and applying a group of rule sets based on the risk level in accordance with an embodiment.

FIG. 4 depicts a block diagram of a system 400 for selecting and applying a group of rule sets based on the risk level. The system 400 may include an end user device 425, a request 420 including authentication information 445, a risk level 430, rule sets 435, a threshold 440, a service 410, a database 415, or an access control service 405, among others. The access control service 405 may include at least a rule selector 450, or a request validator 455. Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the end user device 425, the access control service 405, or the service 410) may be any computing device comprising one or more processors coupled with memory and software, and capable of performing the various processes and tasks described herein.

The rule selector 450 may identify or select, from the rule sets 435 based on the identified risk level of the request 420, a group of the rule sets 435 to apply to the request 420. As discussed above, a group of rule sets 435 may be defined for a given risk level 430. For example, a risk level of 1 may be defined or associated with a first set of rule sets and a risk level of 2 may be defined or associated with a second set of rule sets. In this example, the first group and second group of rule sets 435 may include overlapping or intersecting rules or rule sets 435. To further illustrate, the second group of rule sets 435 may include at least a portion of the rule sets of the first group of rule sets 435. The second group of rule sets 435 may further include additional rule sets 435 to the ones included from the first group of rule sets 435. The subsequent rule sets 435 corresponding to the higher risk levels may accumulate or progressively add additional rule sets. This reusability of the rule sets 435 and risk level 430 may enable a high level of configurability and further enables the system to capture multiple different access scenarios seamlessly.

In some embodiments, the rule selector 450 may identify or select the group of the rule sets 435 based on an association with the risk level 430. For example, the access control service 405 may define or associate the group of rule sets 435 with the risk level 430 in the database 415, and the rule selector 450 may select the rule sets 435 based on the association stored in the database 415. The rule selector 450 may select the rule sets 435 based on additional parameters, such as time, the end user device 425, or the transaction type, among others. For example, the rule selector 450 may choose a first rule set 435 for the risk level 430 at one time of day and a second rule set 435 for the risk level 430 at a different time of day. The rule selector 450 may choose a first rule set 435 for the risk level 430 for a first end user device 425 and may choose a second rule set 435 for the risk level 430 for a second end user device 425.

In some embodiments, the rule selector 450 may identify or select an interdiction protocol to supplement or include with the selected group of rule sets 435 for the risk level 430. The interdiction protocol may include one or more measures (e.g., collection of additional information for challenges, network segmentation, introduction detection, and encryption) to mitigate risk from processing the request 420 to access the service 410. In selecting, the rule selector 450 may determine or identify the type of transaction associated with the request 420. With the identification, the rule selector 450 may select the interdiction protocol if the request 420 corresponds to a specific transaction type. For example, the rule selector 450 may select the interdiction protocol associated with transferring a sum of money over a threshold amount. In some embodiments, the rule selector 450 may select more than one group of rule sets 435 depending on the interdiction protocol. For example, the rule selector 450 may select another group of rule sets 435 in addition to the selected group of rule sets 435, based on the interdiction protocol to apply if applying the first group of rule sets 435 results in a challenge of the request 420.

The request validator 455 may execute, carry out, or otherwise apply the selected group of rule sets 435 to process the request 420. In applying the selected group of rule sets 435, the request validator 455 may include to perform the logic defined in the selected group of rule sets 435 to the authentication information 445 associated with the request 420. In processing the request 420 or its authentication information 445 under the rule sets 435, the request validator 455 may determine whether to allow, deny, or challenge the request 420. For example, the request validator 455 may evaluate whether the authentication information 445 meets criteria established by the group of rule sets 435 for the identified risk level 430. For example, the request validator 455 may determine that a password of the authentication information 445 does not match a password rule of the group of rule sets 435 and the request validator 455 may choose to deny the request 420 based on the non-matching password.

The group of rule sets 435 may include multiple rules or rule sets. In applying the selected group of rule sets 435, the request validator 455 may carry out or execute the logic in one or more rules of the group of rule sets 435 sequentially, in a parallel manner, or a combination thereof. For example, an outcome of a first rule of the group of rule sets 435 may determine the second rule of the group of rule sets 435 by which to further process the request 420. Depending on one or more outcomes of applying the group of rule sets 435, the request validator 455 may determine to perform at least one of a denial, allowance, or challenge of the request 420. Denying the request 420 may refer to the access control service 405 not allowing the end user device 425 to access the service 410. Allowing the request may refer to the access control service 405 enabling the end user device 425 to access the service 410 to perform a transaction. Challenging the request 420 may refer to the access control service 405 neither allowing nor denying the request initially, but further applying the rule sets 435 to reach a determination of allowance or denial. For instance, the challenge may include prompting the user of the end user device 425 to enter additional authentication information 445, such as biometric data (e.g., fingerprint or voice). The request validator 455 may determine to challenge the request 420 based on the threshold 440.

In some embodiments, the request validator 455 may determine that one or more of the risk parameters exceeds the challenge threshold 440, when performing a challenge of the request 420. For example, a risk parameter correlated with a geofence of the end user device 425 may be outside a threshold 440 geofence established for the end user device 425 and thus exceeding the threshold 440. When the risk parameters do not exceed the threshold, the request validator 455 may continue with the remaining rules in the group of rule sets 435, and may allow the request 420. In contrast, when exceeding the challenge threshold 440, the request validator 455 may perform to challenge the request 420. In challenging the request 420, the request validator 455 may perform additional check (e.g., requesting for additional information from the user or external services) to determine whether to allow or deny the request 420 to access the service 410 to permit the performance of the transaction identified in the request 420.

Based on the resultant of the challenge request in one rule of the group of rule sets 435, the request validator 455 may apply the subsequent rule in the group of rule sets 435. Continuing on, in some embodiments, the request validator 455 may apply a second rule set if authentication protocol (e.g., multifactor authentication) is not provided by a prior rule set in the group of rule sets 435. Based on the determination, the request validator 455 may initiate a determination to authenticate the request 420 in accordance with the remaining rules in the group of rule sets 435.

In some embodiments, the request validator 455 may collect or gather additional information from the end user device 425. For example, responsive to one or more of the risk parameters exceeding the challenge threshold, the request validator 455 may output a determination to challenge the request 420 in accordance with a first rule. In the subsequent rule in the group of rule sets 435, the request validator 455 may prompt the end user device 425 for additional information. The additional information requested responsive to the challenge may include further authentication information 445. For example, the request validator 455 may ask the end user device 425 to provide an answer to a security question, a username and password, or a fingerprint, among others. With the receipt of the additional information, the request validator 455 may determine to allow, deny, or further challenge the request 420 in accordance with the remainder of the group of rule sets 435.

In some embodiments, the request validator 455 may wait for receipt of the additional information. The end user device 425 may not provide additional information responsive to the request validator 455 prompting. If the end user device 425 does not provide the additional authentication information, the request validator 455 may proceed to a second rule of the rule sets 435. The request validator 455 may proceed to the second rule after a threshold period of time has elapsed from the transmittal of the request for additional information, after the end user device 425 declines to provide additional information, or responsive to no request for additional information being sent to the end user device 425 by the request validator 455. The request validator 455 may not send a request for additional information to the end user device 425 if an outcome of a first rule of the rule sets 435 applied during the challenge does not result in an outcome which indicates to ask for additional information.

By using the rule indexer to define groups of rule sets for risk levels and allowing the rule sets to overlap between risk levels, the number of rules to authenticate access to the service can be greatly reduced. This reusability of rules enables a computationally faster approach to establishing a risk framework for access to the services for performing a transaction. Further, receiving requests by the transaction handler and generating metrics related to the requests by the parameter generator allows the system to reduce or remove entirely any reliance on third-party services for evaluating risks associated with the transaction requests. Through the risk evaluator identifying a risk level for the request, the selection of a rule set can be streamlined with particular granularity, due to the variety of risk levels configurable. The rule selector may reduce computational power necessary by the system by only selecting rule sets which correspond to the risk level identified for the request. The request validator may similarly reduce computational power by applying the rule sets which have been selected and by further applying rules of the rule sets based on outcomes of other rules of the rule sets. In this manner, the access control service as a whole can enable a resilient and granular approach to validating service requests from end user devices.

Figure 5:
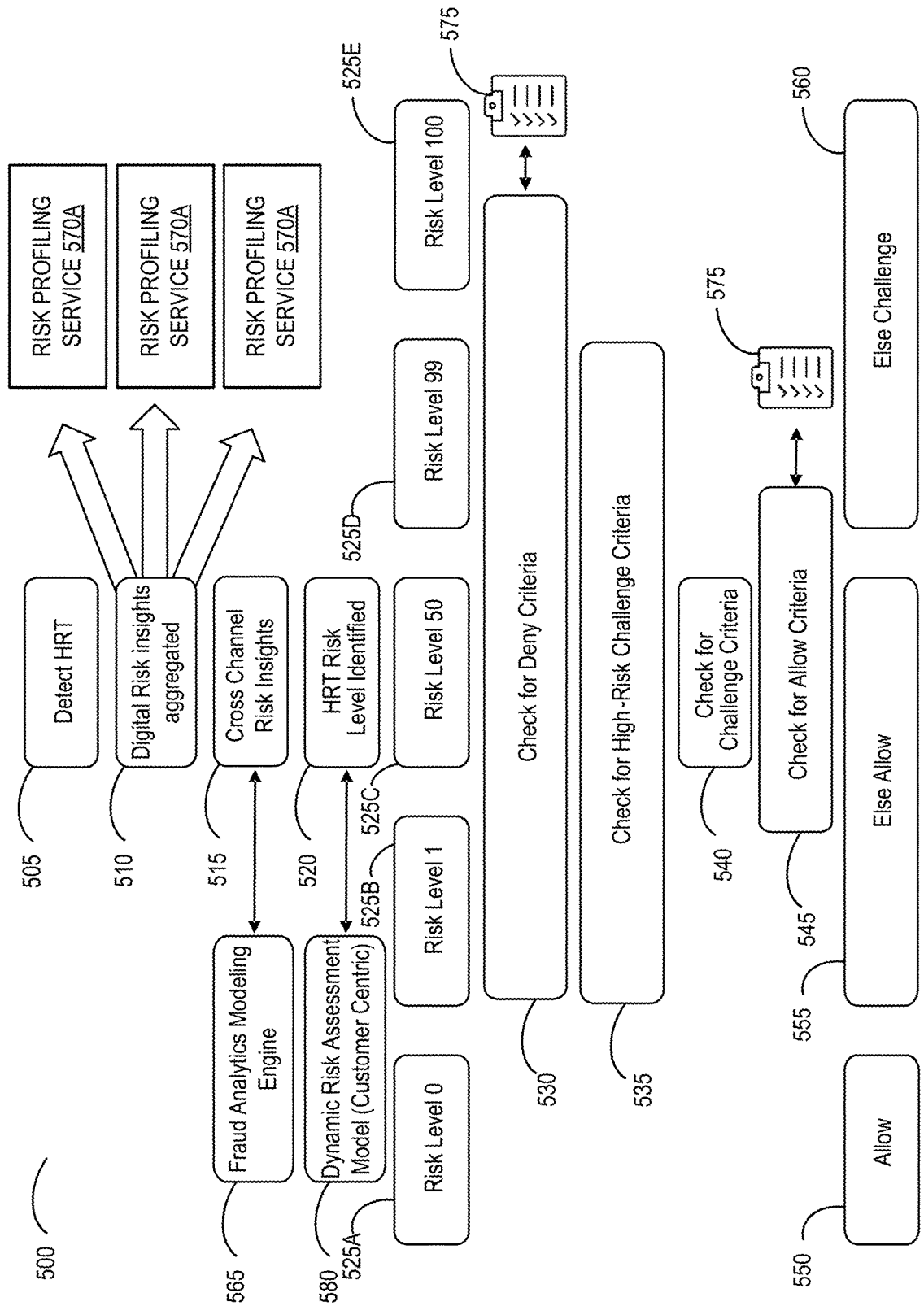
FIG. 5 illustrates a flow diagram of an example method for detecting attempts at fraudulent or malicious transactions and controlling access to services in accordance with an embodiment.

FIG. 5 depicts a flow diagram of a method 500 for detecting attempts at fraudulent or malicious transactions and controlling access to services. The method 500 may be implemented or performed using any of the components detailed herein. Embodiments may include additional, fewer, or different operations from those described in the method 500. The method 500 may be performed by a server executing machine-readable software code, though it should be appreciated that the various operations may be performed by one or more computing devices and/or processors. At step 510, the server receives a request.

At step 505, the server detects a high-risk transaction (HRT). The server can receive, from an end user device, a request for a service to perform a transaction. The transaction can be a high-risk transaction, such as a transaction to open a new line of credit or to transfer a sum of money over a threshold amount. The server can receive, intercept, or otherwise identify the transmission or sending of the request for the high-risk transaction. A high-risk transaction can cause the server to execute the flow denoted in the method 500. At step 510, digital risk insights can be aggregated. Digital risk insights can be aggregated by the parameter generator. The digital risk insights can be received from the end user device, a profile associated with the end user device, a risk profiling service 570, or a combination thereof. The risk profiling services 570 may be a third-party or external service which may determine, evaluate, or aggregate information for the parameter generator to determine the risk parameters based on.

At step 515, the cross channel risk insights may be aggregated. The cross channel risk insights may be another information which the parameter generator may use to generate the risk parameters. The cross channel risk insights may be aggregated from a fraud analytics modeling engine (FAME) 565. The fraud analytics modeling engine may include one or more machine learning models which may analyze information from the request including the transaction type for the parameter generator to create the risk parameters. At step 520, the HRT risk level can be identified. The risk evaluator can determine the HRT risk level (or simply, the risk level) based on the risk parameters generated by the parameter generator using the cross channel risk insights and the digital risk insights. The risk evaluator may determine the risk level using a dynamic risk assessment model 580. The dynamic risk assessment model 580 may use historical data related to the end user device or a profile associated with the end user device to generate a risk level for the transaction request based on the end user device. The risk evaluator may determine a risk level such as the risks levels of 525, such as a risk level of 0, 1, 50, 99, or 100. The risk levels denoted in FIG. 5 are illustrative and are not inclusive of all possible risk levels.

The steps 530-560 may all be steps, rules, or rule sets executed as a part of a rule set selected by the rule selector responsive to the determination of the risk level. For example, for risk level 50, steps 530-555 may be defined to be performed, whereas for risk level 100, steps 530 and 560 may be defined to be performed. The steps 530-560 may be executed for different risk levels 525, and may be executed entirely, in part, sequentially, in parallel, or a combination thereof. At step 530, the server may check for deny criteria. Deny criteria (e.g., a deny rule set) may be associated with the selected risk level 525. In some embodiments, if the request does not satisfy the deny criteria, the request can be denied and the denial stored in the database 575. At step 535, the server may check for high-risk challenge criteria. The server may check for high-risk challenge criteria in accordance with an interdiction protocol. The server may check for high-risk challenge criteria responsive to the server checking for deny criteria. High-risk challenge criteria may utilize a rule set including a challenge threshold.

At step 540, the server may check for challenge criteria. The challenge criteria may be different or the same as the high-risk challenge criteria of step 535. At step 545, the server may check for allow criteria. The allow criteria may be an allow rule set. If the request satisfies the allow criteria, the server may allow the request to access the service to perform the transaction, and the server may store the allowed request in the database 575. If the request does not satisfy the allow criteria, the server may process further rule sets. For example, if the request does not satisfy the allow criteria, the server may apply a different allow rule set 550, an else allow rule set 555, or an else challenge rule set 560.

Figure 6:
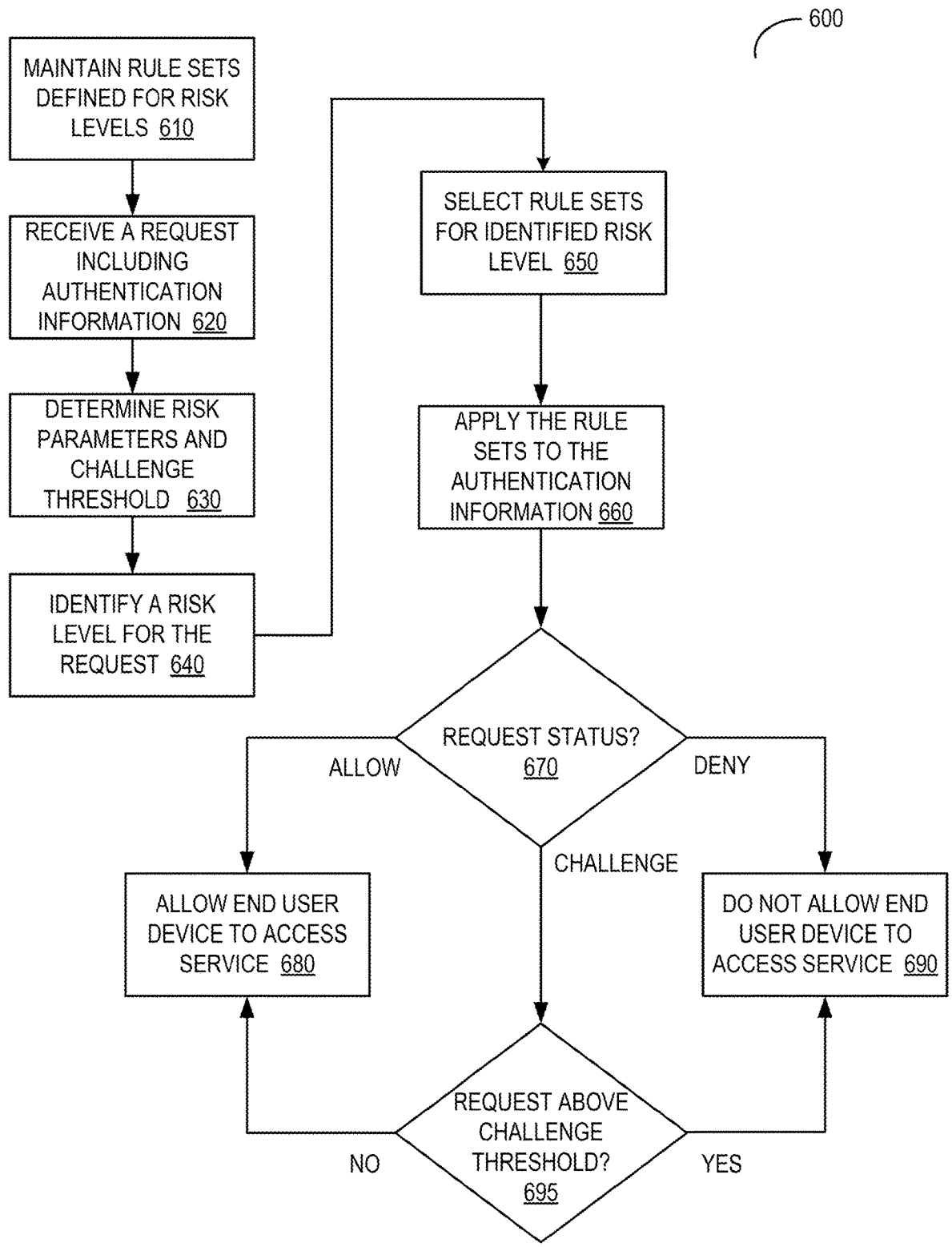
FIG. 6 illustrates a flow diagram of an example method of controlling access to services for processing requests in accordance with an embodiment.

FIG. 6 depicts a flow diagram of a method 600 for controlling access to services for processing requests. The method 600 may be implemented or performed using any of the components detailed herein. Embodiments may include additional, fewer, or different operations from those described in the method 600. The method 600 may be performed by a server executing machine-readable software code, though it should be appreciated that the various operations may be performed by one or more computing devices and/or processors. At step 610, the server maintains rule sets defined for risk levels.

At step 620, the server receives a request including authentication information. The request may be from an end user device. The request may be for the end user device to access a service to perform a transaction. The request can include authentication information. The authentication information may be used by the server to validate or verify the end user device as being associated with a user profile, or may validate the end user device as having permissions to perform the requested transaction. At step 630, the server determines risk parameters and a challenge threshold. The server may determine risk parameters and a challenge threshold based on the end user device, the request, the transaction indicated in the request, the authentication information, or a combination thereof. The server may determine the risk parameters based on historical information corresponding to the end user device.

At step 640, the server identifies a risk level for the request. The risk level can be a metric corresponding to how risky or likely to be fraudulent a request for accessing a service for processing a transaction may be. The server may identify the risk level responsive to or based on the risk parameters. At step 650, the server may select one or more rule sets for the identified risk level. The server may select the one or more rule sets based on the rule sets defined for the identified risk level. The rule sets may include rule sets for allowing, denying, or challenging the request to access the service for processing a transaction. At step 660, the server may apply the rule sets to the authentication information. The server may apply the rule sets to the authentication information to check, test, or otherwise determine if the authentication information satisfies one or more of the rule sets. Applying the rule sets may include the server making a determination to allow, deny, or challenge the request based on the rule sets.

At step 670, the server determines the status of the request. If the server determines the request to be allowed, then the server may proceed to step 680, wherein the server allows the end user device to access the service to process the transaction. If the server determines the request to be denied, then the server may proceed to step 690, wherein the server does not allow the end user device to access the service to process the transaction. The server may determine to challenge the request, based at least on the applied rule sets. At step 695, the server challenges the request. The server may challenge the request if one or more risk parameters exceeds a threshold, if one or more rule sets indicates a challenge outcome, or if the transaction type of the request is determined by the server to be high risk, among others. If the request is above the challenge threshold, the server may proceed to step 690. If the request is below the challenge threshold, the server may proceed to step 680.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of controlling access to services for processing requests, comprising:
maintaining, by a first service having at least one processor, a plurality of rules to control requests for accessing at least one of a plurality of second services based on likelihoods associated with the requests as being fraudulent, the plurality of rules for at least one of a plurality of transaction types in accordance with at least one of a plurality of risk levels, the plurality of rules comprising a first rule for an allowance of access, a second rule for a denial of access, and a third rule for a challenge, the plurality of transaction types corresponding to a corresponding plurality of functions to be performed on at least one of the plurality of second services;
receiving, by the first service, for a first risk level of the plurality of risk levels, an instruction defining a first group of rules from the plurality of rules to apply to requests identified with the first risk level, each of the plurality of risk levels corresponding to a respective range of likelihoods associated with the requests as being fraudulent;
configuring, by the first service, responsive to receiving the instruction, the first level of the plurality of risk levels with the first of group of rules of the plurality of rules in accordance with the instruction, the first group of rules including a subset of rules of a second group of rules configured for a second risk level of the plurality of risk levels;
receiving, by the first service, a request for an end user device to access a resource on a second service of the plurality of second services to perform a function according to a transaction type of the plurality of transaction types, the request including authentication information;
determining, by the first service, (i) a plurality of risk parameters defining a corresponding plurality of criteria to determine a likelihood that the request is fraudulent and (ii) a challenge threshold in accordance to which to challenge the request, based on the plurality of criteria comprising the transaction type of the request, the end user device, and the second service to be accessed;
identifying, by the first service, from the plurality of risk levels, the first risk level indicating the likelihood that the request is fraudulent based on the plurality of risk parameters;
selecting, by the first service, the first group of rules from the plurality of rules to apply defined for the identified first risk level, the first group of rules at least partially sharing with rules with the second group of rules of the second risk level; and
applying, by the first service, the first group of rules to the authentication information to perform at least one of the denial, the allowance, or the challenge of the request of the transaction type using the challenge threshold, for the end user device to access the resource on the second service for performing the function according to the transaction type of the request, wherein applying the first group of rules further comprises performing, responsive to no authentication protocol identified in an output of the challenge in accordance with a fourth rule of the first group of rules, a fifth rule of the first group of rules to determine to initiate authentication.

2. The method of claim 1, further comprising:
receiving, by the first service, an instruction identifying at least one rule for the plurality of rules, the at least one rule defining logic to perform at least one of the allowance, the denial, or the challenge of requests to access the plurality of second services; and configuring, by the first service, the plurality of rules to include the at least one rule identified in the instruction, independent of defining the plurality of risk levels.

3. The method of claim 1, further comprising:

receiving, by the first service, an indication of a change in a level of risk tolerance for accessing at least one of the plurality of second services for requests of the transaction type; and re-configuring, by the first service, the first risk level of the plurality of risk levels with a third group of rules based on the indication of the change in the level of risk tolerance.

4. The method of claim 1, further comprising:

identifying, by the first service, from the plurality of transaction types, the transaction type corresponding to the request to access the second service; and selecting, from a plurality of interdiction protocols, an interdiction protocol to add to the first group of rules in response to the transaction type of the request corresponding to a predefined transaction type, the plurality of interdiction protocols comprising at least one of a collection of information for the challenge, a network segmentation, data detection, or an encryption, wherein applying the first group of rules further comprises applying the first group of rules including the interdiction protocol, responsive to determining to perform the challenge of the request.

5. The method of claim 1, further comprising:

applying, by the first service, a fraud analytics model to the request to generate a metric indicating a likelihood of fraud in accessing the second service for the type of transaction; and wherein identifying the risk level further comprises identifying the risk level based on the metric indicating the likelihood of fraud.

6. The method of claim 1, further comprising:

identifying, by the first service, from a plurality of risk profiling services from which to obtain information on the transaction type of the request, the end user device, or the second service to be accessed, at least one risk profiling service as inaccessible via an interface; and wherein determining the plurality of risk parameters further comprises determining the plurality of risk parameters using information from a remainder of the plurality of risk profiling services, without information from the at least one risk profiling service.

7. The method of claim 1, further comprising wherein applying the first group of rules further comprises applying the first group of rules to perform the challenge of the request, responsive to at least one of the plurality of risk parameters exceeding the challenge threshold.

8. The method of claim 1, wherein applying the first group of rules further comprises performing, based on an output of the challenge performed in accordance with a sixth rule of the first group of rules, a seventh rule of the first group of rules to collect additional information associated with the request with which to determine whether to perform the allowance, denial, or the challenge at a second time.

9. A system for controlling access to services for processing requests, comprising:

one or more processors coupled with memory, configured to:

maintain a plurality of rules defined for a plurality of risk levels to control requests for accessing at least one of a plurality of second services based on likelihoods associated with the requests as being fraudulent, the plurality of rules for at least one of a plurality of transaction types, the plurality of rules comprising a first rule for an allowance of access, a second rule for a denial of access, and a third rule for a challenge, the plurality of transaction types corresponding to a corresponding plurality of functions to be performed on at least one of the plurality of second services;

receive for a first risk level of the plurality of risk levels, an instruction defining a first group of rules from the plurality of rules to apply to requests identified with the first risk level, each of the plurality of risk levels corresponding to a respective range of likelihoods associated with the requests as being fraudulent;

configure, responsive to receiving the instruction, the first risk level of the plurality of risk levels with the first of group of rules of the plurality of rules in accordance with the instruction, the first group of rules including a subset of rules of a second group of rules configured for a second risk level of the plurality of risk levels;

receive a request of a transaction type of the plurality of transaction types for an end user device to access a resource on a second service of the plurality of second services, the request including authentication information;

determine (i) a plurality of risk parameters defining a corresponding plurality of criteria to determine a likelihood that the request is fraudulent and (ii) a challenge threshold in accordance to which to challenge the request, based on the plurality of criteria comprising the transaction type of the request, the end user device, and the second service to be accessed;

identify, from the plurality of risk levels, the first risk level indicating a likelihood that the request is fraudulent based on the plurality of risk parameters, the risk level defining the group of rules at least partially shared with another risk level of the plurality of risk levels;

select the first group of rules from the plurality of rules to apply for the identified risk level, the first group of rules at least partially sharing with rules with the second group of rules of the second risk level; and apply the first group of rules to the authentication information to perform at least one of the denial, the allowance, or the challenge of the request of the transaction type using the challenge threshold, for the end user device to access the resource on the second service for performing the function according to the transaction type of the request, wherein applying the first group of rules further comprises performing, responsive to no authentication protocol identified in an output of the challenge in accordance with a fourth rule of the first group of rules, a fifth rule of the first group of rules to determine to initiate authentication.

10. The system of claim 9, wherein the one or more processors are configured to:

receive an instruction identifying at least one rule for the plurality of rules, the at least one rule defining logic to perform at least one of the allowance, the denial, or the challenge of requests to access the plurality of second services; and configure the plurality of rules to include the at least one rule identified in the instruction, independent of defining the plurality of risk levels.

11. The system of claim 9, wherein the one or more processors are configured to:
receive an indication of a change in a level of risk tolerance for accessing at least one of the plurality of second services for requests of the transaction type; and
re-configure the first risk level of the plurality of risk levels with a third group of rules based on the indication of the change in the level of risk tolerance.

12. The system of claim 9, wherein the one or more processors are configured to:
identify, from the plurality of transaction types, the transaction type corresponding to the request to access the second service;
select, from a plurality of interdiction protocols, an interdiction protocol to add to the first group of rules in response to the transaction type of the request corresponding to a predefined transaction type; and
apply the first group of rules including the interdiction protocol, responsive to determining to perform the challenge of the request.

13. The system of claim 9, wherein the one or more processors are configured to:
apply a fraud analytics model to the request to generate a metric indicating a likelihood of fraud in accessing the second service for the type of transaction; and
identify the risk level based on the metric indicating the likelihood of fraud.

14. The system of claim 9, wherein the one or more processors are configured to:
identify, from a plurality of risk profiling services from which to obtain information on the transaction type of the request, the end user device, or the second service to be accessed, at least one risk profiling service as inaccessible via an interface; and
determine the plurality of risk parameters using information from a remainder of the plurality of risk profiling services, without information from the at least one risk profiling service.

15. The system of claim 9, wherein the one or more processors are configured to apply the first group of rules to perform the challenge of the request, responsive to at least one of the plurality of risk parameters exceeding the challenge threshold.

16. The system of claim 9, wherein the one or more processors are configured to perform, based on an output of the challenge performed in accordance with a sixth rule of the first group of rules, a seventh rule of the group of rules to collect additional information associated with the request with which to determine whether to perform the allowance, denial, or the challenge at a second time.

17. A non-transitory computer readable medium storing instructions, which when executed by at least one processor, cause the at least one processor to:

maintain a plurality of rules defined for a plurality of risk levels to control requests for accessing at least one of a plurality of second services based on likelihoods associated with the requests as being fraudulent, the plurality of rules for at least one of a plurality of transaction types, the plurality of rules comprising a first rule for an allowance of access, a second rule for a denial of access, and a third rule for a challenge, the plurality of transaction types corresponding to a corresponding plurality of functions to be performed on at least one of the plurality of second services;
receive for a first risk level of the plurality of risk levels, an instruction defining a first group of rules from the plurality of rules to apply to requests identified with the first risk level, each of the plurality of risk levels corresponding to a respective range of likelihoods associated with the requests as being fraudulent;
configure, responsive to receiving the instruction, the first risk level of the plurality of risk levels with the first of group of rules of the plurality of rules in accordance with the instruction, the first group of rules including a subset of rules of a second group of rules configured for a second risk level of the plurality of risk levels;
receive a request of a transaction type of the plurality of transaction types for an end user device to access a resource on a second service of the plurality of second services, the request including authentication information;
determine (i) a plurality of risk parameters defining a corresponding plurality of criteria to determine a likelihood that the request is fraudulent and (ii) a challenge threshold in accordance to which to challenge the request, based on the plurality of criteria comprising the transaction type of the request, the end user device, and the second service to be accessed;
identify, from the plurality of risk levels, the first risk level indicating a likelihood that the request is fraudulent based on the plurality of risk parameters, the risk level defining the group of rules at least partially shared with another risk level of the plurality of risk levels;
select the first group of rules from the plurality of rules to apply for the identified risk level, the first group of rules at least partially sharing with rules with the second group of rules of the second risk level; and
apply the first group of rules to the authentication information to perform at least one of the denial, the allowance, or the challenge of the request of the transaction type using the challenge threshold, for the end user device to access the resource on the second service for performing the function according to the transaction type of the request, wherein applying the first group of rules further comprises performing, responsive to no authentication protocol identified in an output of the challenge in accordance with a fourth rule of the first group of rules, a fifth rule of the first group of rules to determine to initiate authentication.

\* \* \* \* \*